US011242249B2

(12) United States Patent
Susantyoko et al.

(10) Patent No.: US 11,242,249 B2
(45) Date of Patent: Feb. 8, 2022

(54) TAPE-CASTING APPARATUSES FOR PREPARING CARBON NANOSTRUCTURE SHEETS AND CARBON NANOSTRUCTURE SHEETS PREPARED BY THE SAME

(71) Applicant: KHALIFA UNIVERSITY OF SCIENCE AND TECHNOLOGY, Abu Dhabi (AE)

(72) Inventors: Rahmat Agung Susantyoko, Muntilan (ID); Zainab Karam, Abu Dhabi (AE); Saif Almheiri, Abu Dhabi (AE); Ibrahim Husein Salim Mustafa, Amman (JO)

(73) Assignee: Khalifa University of Science and Technology, Abu Dhabi (AE)

( * ) Notice: Subject to any disclaimer, the term of this patent is extended or adjusted under 35 U.S.C. 154(b) by 161 days.

(21) Appl. No.: 16/615,851

(22) PCT Filed: Jun. 5, 2018

(86) PCT No.: PCT/IB2018/054024
§ 371 (c)(1),
(2) Date: Nov. 22, 2019

(87) PCT Pub. No.: WO2018/224965
PCT Pub. Date: Dec. 13, 2018

(65) Prior Publication Data
US 2020/0172399 A1 Jun. 4, 2020

Related U.S. Application Data

(60) Provisional application No. 62/516,534, filed on Jun. 7, 2017.

(51) Int. Cl.
*C01B 32/168* (2017.01)
*B29C 41/16* (2006.01)
(Continued)

(52) U.S. Cl.
CPC ............ *C01B 32/168* (2017.08); *B29C 41/16* (2013.01); *B29C 41/42* (2013.01); *B82Y 30/00* (2013.01);
(Continued)

(58) Field of Classification Search
CPC .............. C01B 32/168; C01B 2202/02; C01B 2202/06; C01B 2202/08; C01B 32/182;
(Continued)

(56) References Cited

U.S. PATENT DOCUMENTS

2013/0040229 A1\* 2/2013 Grigorian ............. C07C 233/00
429/532
2013/0089656 A1 4/2013 McComiskey et al.
2015/0344410 A1 12/2015 Grigorian et al.

FOREIGN PATENT DOCUMENTS

WO 2011/163129 12/2011

OTHER PUBLICATIONS

Bonet, et al., A New Production route for Tailor-Made Buckypaper, accessed online at: https://www.hs-regensburg.de/fileadmin/media/fakultaeten/ei/forschung_projekte/MAPR_Ver%C3%B6ffentlichungen/ARC_Bonet.pdf (2012) (Year: 2012).\*

(Continued)

*Primary Examiner* — Daniel C. McCracken
(74) *Attorney, Agent, or Firm* — Billion & Armitage

(57) ABSTRACT

Apparatuses and methods for preparing carbon nanostructure sheets are provided. The apparatuses may include a casting body including a substrate configured to move along a first direction, a slurry reservoir configured to contain a slurry, a dispenser connected to the slurry reservoir and configured to dispense the slurry onto a surface of the substrate and a doctoring member that extends in a second direction traversing the first direction and that is positioned above the surface of the substrate. The slurry may include (Continued)

carbon nanostructures, and/or one or more functional materials. The doctoring member may be spaced apart from the surface of the substrate by a predetermined distance.

20 Claims, 22 Drawing Sheets

(51) Int. Cl.
  *B29C 41/42* (2006.01)
  *B82Y 30/00* (2011.01)
  *B82Y 40/00* (2011.01)

(52) U.S. Cl.
  CPC ........... *B82Y 40/00* (2013.01); *C01B 2202/02* (2013.01); *C01B 2202/06* (2013.01); *C01B 2202/08* (2013.01); *C01P 2004/13* (2013.01)

(58) Field of Classification Search
  CPC ............. C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; B29C 41/16; B29C 41/42; B29C 39/06; B29C 41/12; B82Y 30/00; B82Y 40/00; C01P 2004/13; B32B 5/02
  See application file for complete search history.

(56) References Cited

OTHER PUBLICATIONS

Susantyoko, et al., A surface-engineered tape-casting fabrication technique toward the commercialization of freestanding carbon nanotubesheets, J Mater. Chem. A 2017; 5: 19255-19266 (Year: 2017).*

International Search Report and Written Opinion corresponding to PCT/IB2018/054024, dated Aug. 30, 2018 (11 pp).

* cited by examiner

TAPE-CASTING APPARATUSES FOR PREPARING CARBON NANOSTRUCTURE SHEETS AND CARBON NANOSTRUCTURE SHEETS PREPARED BY THE SAME

CROSS-REFERENCE TO RELATED APPLICATIONS

This application is a 35 U.S.C. 371 national stage application PCT International Application No. PCT/IB2018/054024, filed Jun. 5, 2018, which claims the benefit of U.S. Provisional Patent Application Ser. No. 62/516,534, filed Jun. 7, 2017, the contents of which are incorporated herein in their entireties by reference. The above-referenced PCT International Application was published in the English language as International Publication No. WO 2018/224965 A1 on Dec. 13, 2018.

FIELD OF THE INVENTION

The present invention relates to tape-casting apparatuses for preparing carbon nanostructure sheets and carbon nanostructure sheets prepared by the same.

BACKGROUND

Conventional methods to prepare carbon nanotube sheets (e.g., freestanding multi-walled carbon nanotube sheets (MWCNT sheet)), such as a membrane filtration method, may produce carbon nanotube sheets having a relatively small geometric area and may have a limited throughput. Accordingly, it may be difficult to scale up carbon nanotube sheets preparation methods, and thus it may be difficult to prepare carbon nanotube sheets by mass-production even though carbon nanotube sheets have numerous potential applications including using as electrodes of lithium-ion batteries.

Carbon nanostructure sheets may translate unique properties of individual nanoscale carbon nanotubes to easy-to-handle macroscale sheets. Carbon nanostructure sheets have been reported to be very promising in many applications of energy, aerospace, water purification, etc.

Membrane-filtration methods[1]-[6] are common techniques for preparing carbon nanostructure sheets but these methods may use relatively expensive membranes, may require a long filtration time (hours) due to increased resistance for fluid to pass through especially for thick carbon nanostructure sheets, and may produce carbon nanostructure sheets having a relatively small dimension (e.g., ≤9 cm diameter), etc. Further, it has been reported that usage of moulds and vacuum-heating may also hinder the scalability[7],[8].

Methods using a chemical vapor deposition (CVD) process have also been introduced. N12 Technologies, Inc. introduced a method of continuously growing carbon nanotubes on a moving substrate using a CVD process. Applications of the method of N12 Technologies, Inc. may be limited since the method uses a moving substrate. For example, a thickness of carbon nanostructure sheets prepared by the method of N12 Technologies, Inc. may be limited by the speed of the moving substrate. Nanocomp Technologies, Inc. introduced a method of growing carbon nanotubes on a substrate using a CVD process that is carried out in a specially designed large horizontal CVD chamber. According to the method of Nanocomp Technologies, Inc., a size of a carbon nanostructure sheet may be limited by a size of the CVD chamber. Further, using CVD processes may increase cost of preparing carbon nanostructure sheets since CVD apparatuses are expensive.

BRIEF SUMMARY OF EMBODIMENTS

Provided herein are tape-casting apparatuses for preparing carbon nanostructure sheets and carbon nanostructure sheets prepared by the same. In some embodiments, provided is a carbon nanostructure—functional material composite sheet.

According to some embodiments, apparatuses may include a casting body including a substrate (e.g., a conveyor belt) that is configured to move along a first direction (e.g., a longitudinal direction of the substrate), a slurry reservoir configured to contain a slurry, a dispenser connected to the slurry reservoir and configured to dispense the slurry onto a surface of the substrate, and a doctoring member (e.g., a doctor blade) that extends in a second direction traversing the first direction and that is positioned above the surface of the substrate. The slurry may include carbon nanostructures and/or one or more functional materials (e.g., surfactants, emulsifying agents, binders (e.g., polyvinylidene fluoride (PVDF)), metals, metals oxides, and metals alloys), and the functional materials may be organic and/or inorganic. The doctoring member may be spaced apart from the surface of the substrate by a predetermined distance (e.g., greater than about 0.01 mm).

According to some embodiments, carbon nanostructure sheets having an electrical conductivity in a range of about $2\times10^3$ to about $2\times10^5$ $Sm^{-1}$ are provided. The carbon nanostructure sheets may include carbon nanostructures (e.g., carbon nanotubes) that have directionality and are aligned in a direction (e.g., a direction parallel to or perpendicular to a longitudinal direction of the carbon nanostructure sheet, and/or a direction forming an angle with a longitudinal direction of the carbon nanostructure sheet). The carbon nanostructure sheets may include carbon nanostructures (e.g., carbon nanotubes), and the carbon nanostructure sheet has different mechanical, electrical and/or thermal properties according to a direction with which the carbon nanostructures are aligned.

According to some embodiments, devices comprising a carbon nanostructure sheet are provided. The devices may be a battery, a component for energy storage of a battery, a supercapacitor, a fuel-cell, an electrolyzer, a flexible and/or wearable device, a flame resistant and/or flame retardant device, a heater, a heat sink device, a water desalination device, a water-oil separation device, a lightening protection device, a EMI shielding device, a CNT-polymer composite device, a sensor, a switches device, a dosimeter, a water purification device, and/or a drug-delivery device. In some embodiments, the carbon nanostructure sheets may be used as an electrode or a membrane of a water purification device.

DETAILED DESCRIPTION OF EMBODIMENTS

The present invention will now be described more fully hereinafter. This present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terminology used in the description of the present invention herein is for the purpose of describing particular embodiments only and is not intended to be limiting of the present invention. As used in the description of the present invention and the appended claims, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. The terminology used in the description of the present invention herein is for the purpose of describing particular embodiments only and is not intended to be limiting of the present invention.

Also as used herein, "and/or" refers to and encompasses any and all possible combinations of one or more of the associated listed items, as well as the lack of combinations when interpreted in the alternative ("or"). As used herein, the terms "increase," "increases," "increased," "increasing" and similar terms indicate an elevation in a value or parameter of at least about 5%, 10%, 25%, 50%, 75%, 100%, 150%, 200%, 300%, 400%, 500% or more.

Figure 1:
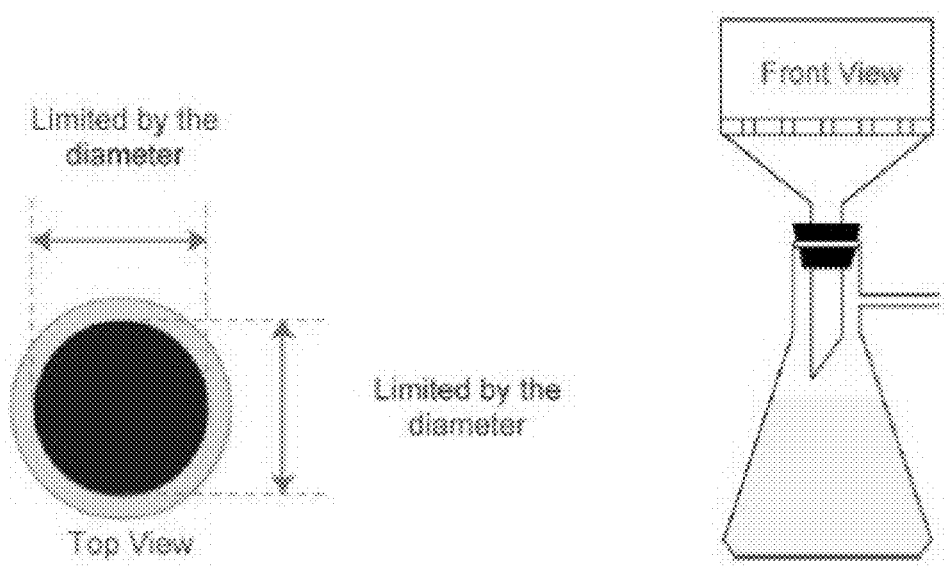
FIG. 1 illustrates aspects of a membrane filtration method.

Unless the context indicates otherwise, it is specifically intended that the various features of the present invention described herein can be used in any combination. Moreover, the present invention also contemplates that in some embodiments of the present invention, any feature or combination of features set forth herein can be excluded or omitted. To illustrate, if the specification states that a complex comprises components A, B and C, it is specifically intended that any of A, B or C, or a combination thereof, can be omitted and disclaimed. FIG. 1 illustrates aspects of a membrane filtration method. Sizes of carbon nanotube sheets prepared by a membrane filtration method may be limited by the diameter of a membrane as illustrated in FIG. 1.

On the contrary, apparatuses and methods according to some embodiments of the present invention may produce carbon nanostructure sheets having a large area. In some embodiments, the area may be increased compared to a sheet prepared by a membrane filtration method.

According to some embodiments of the present invention, facile and scalable methods for preparing freestanding, flexible and foldable carbon nanostructure sheets using a tape-casting technique are provided. The methods may not use moulds. The methods according to some embodiments of the present invention may have several advantages over a membrane filtration method. The methods may be implemented in batch and/or roll-to-roll processing and may have a high throughput. The methods may produce carbon nanostructure sheets having a tunable length, thickness, density and/or composition and may produce carbon nanostructure sheets with superior properties.

Figure 2A:
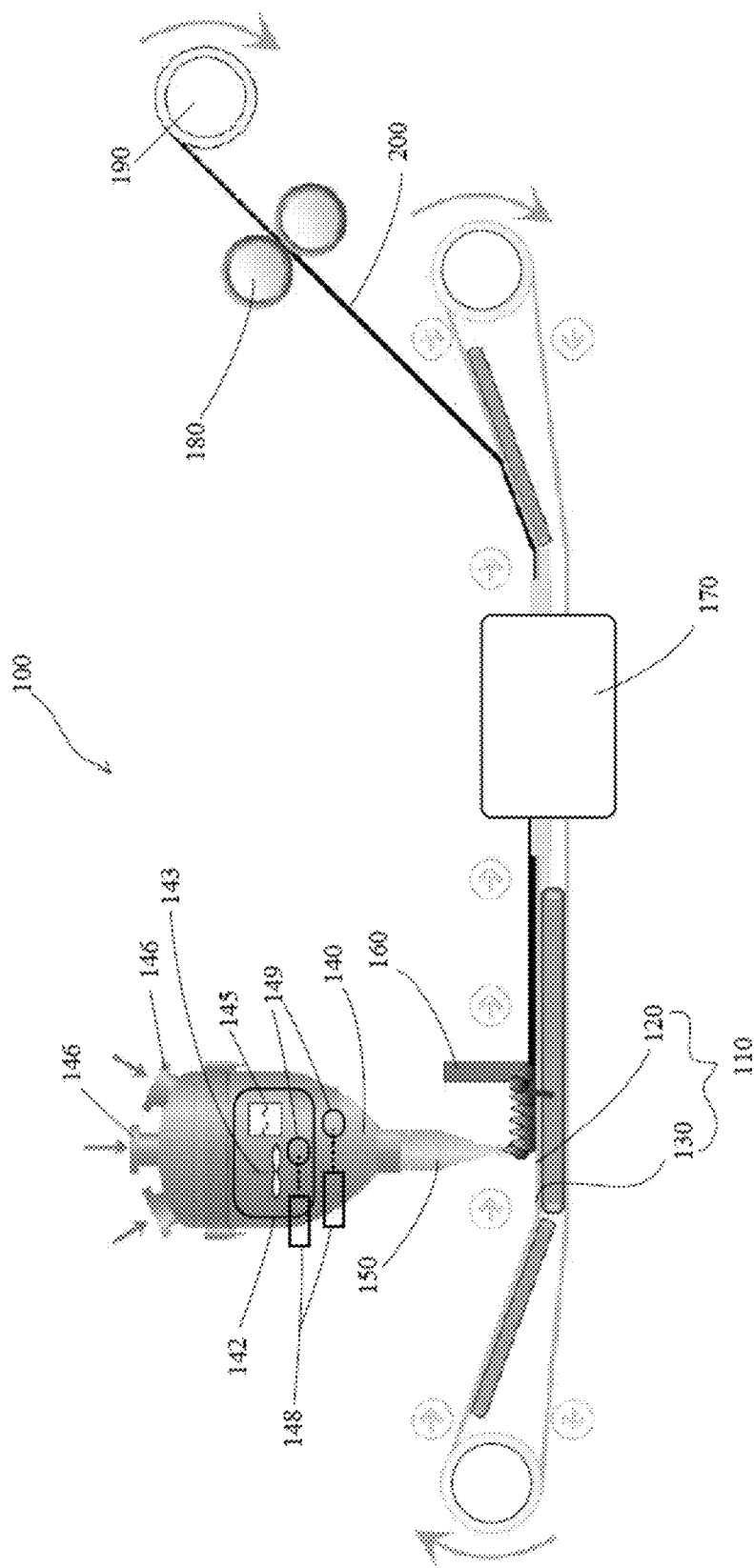
FIG. 2A illustrates a tape-casting apparatus according to some embodiments of the present invention.
Figure 2B:
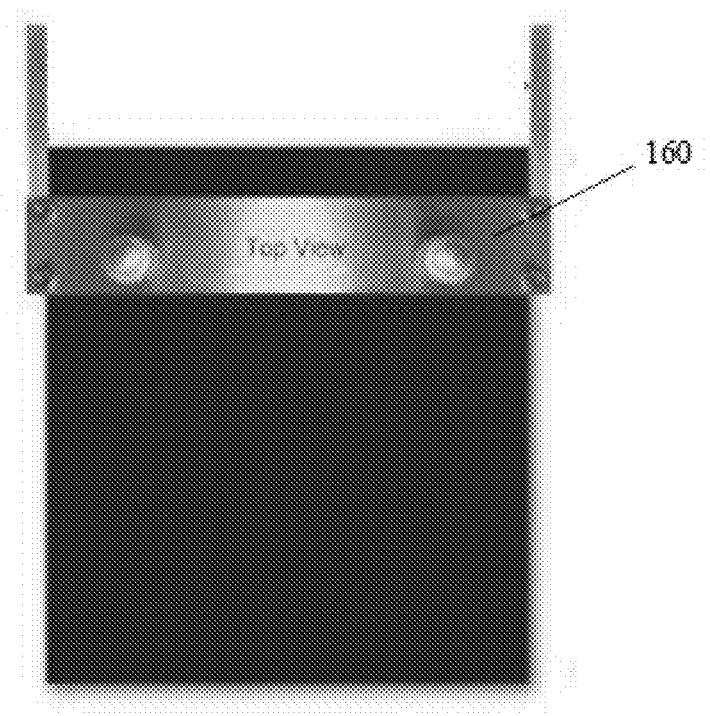
FIGS. 2B and 2C are a plan view and a front view, respectively, of a doctor blade according to some embodiments of the present invention.
Figure 2C:
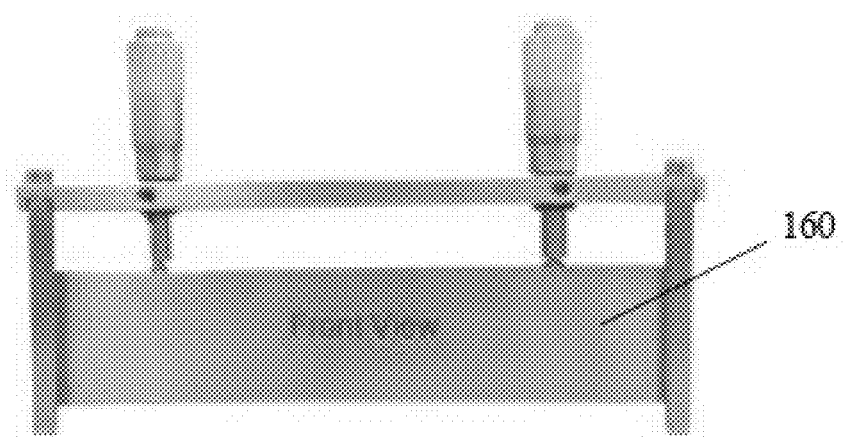

FIG. 2A illustrates a tape-casting apparatus according to some embodiments of the present invention. FIG. 2B and FIG. 2C are a plan view and a front view, respectively, of a doctor blade according to some embodiments of the present invention. It, however, will be understood that, the present invention is not limited to the doctor blades shown in FIG. 2B and FIG. 2C. Doctor blades having various shapes may be used.

Figure 2D:
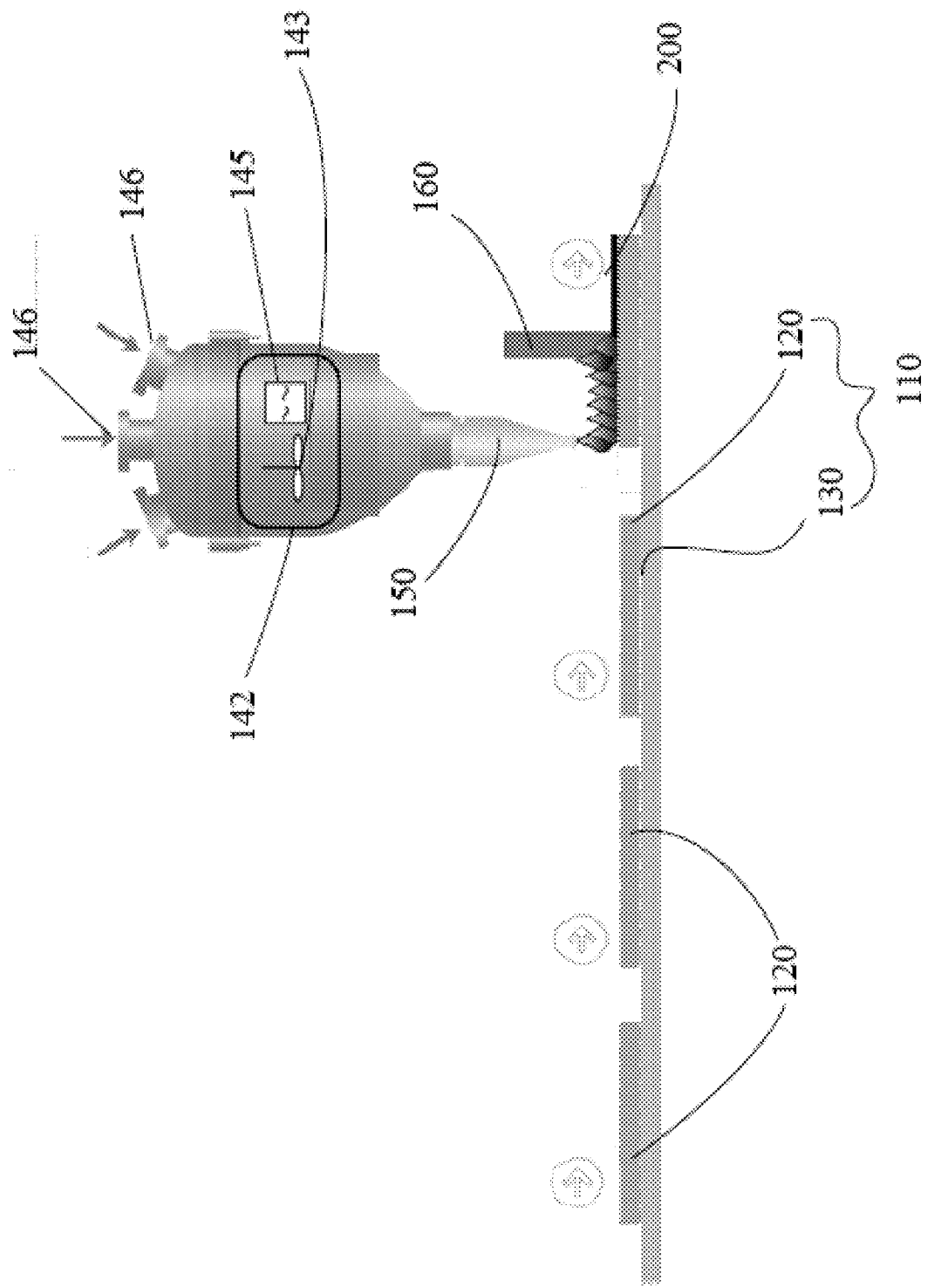
FIG. 2D illustrates a tape-casting apparatus according to some embodiments of the present invention.
Figure 2H:
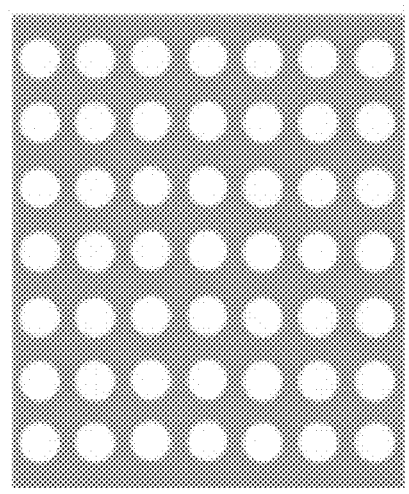
FIGS. 2E-2H show different shapes of a substrate in plan view according to some embodiments of the present invention.
Figure 2G:
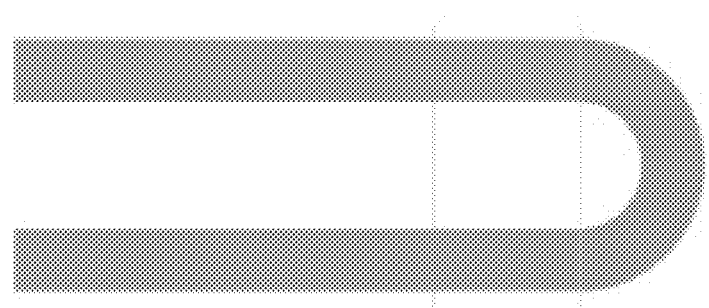
Figure 2E:
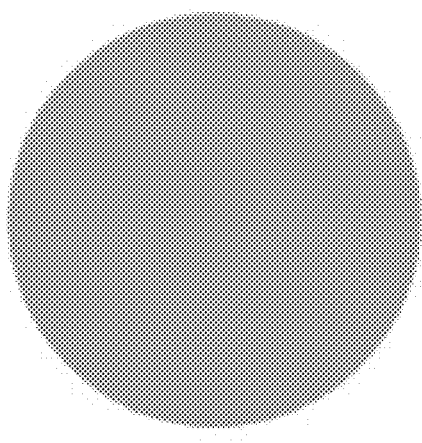

FIG. 2D illustrates a tape-casting apparatus according to some embodiments of the present invention, and FIGS. 2E-2I1 show different shapes of a substrate in plan view according to some embodiments of the present invention.

Referring to FIG. 2A, a tape-casting apparatus 100 according to some embodiments of the present invention may include a casting body 110 including a substrate 120. In some embodiments, the substrate 120 may be placed on a conveyor 130 and may be moveable with the conveyor 130 along a first direction (e.g., a longitudinal direction of the substrate) as represented by arrows above the casting body 110. In some embodiments, the conveyor 130 may be a conveyor belt or an endless conveyor belt. In some embodiments, the substrate 120, itself, may be a conveyor 130 (e.g., a conveyor belt, an endless conveyor belt) and may be configured to move along the first direction. In some embodiments, a temperature of the substrate 120 may be maintained at room temperature or may be heated to a temperature greater than room temperature (e.g., 300° C.)

Figure 2F:
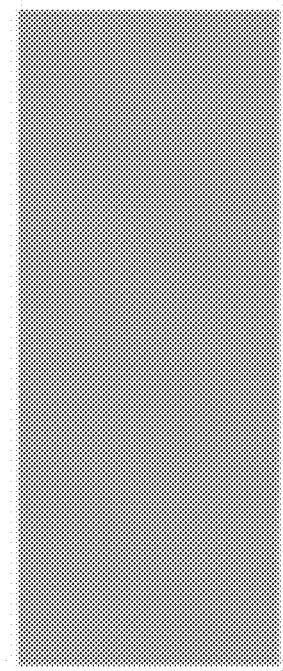

Referring to FIG. 2D, a tape-casting apparatus according to some embodiments of the present invention may include multiple substrates 120 that are spaced apart from each other and may be placed on the conveyor 130. In some embodiments, the multiple substrates 120 may be portions of the conveyor 130. Each of the substrates 120 may have a predetermined shape in plan view, such as a round shape (see FIG. 2E), a rectangular shape (see FIG. 2F), a U-shape (see FIG. 2G), a perforated square shape (see FIG. 2H, a tube shape, a mesh shape and an I-shape, and tape-casted carbon nanostructure sheets 200 that are prepared using the substrates 120 may have a shape same as a shape of the substrates 120.

The tape-casting apparatus 100 may also include a slurry reservoir 140 that is configured to contain a slurry and a dispenser 150 that is connected to the slurry reservoir and is configured to dispense the slurry onto a surface of the substrate 120. The dispenser 150 may include normal dispenser or spray dispenser. The slurry may include carbon nanostructures and/or one or more functional materials. In some embodiments, the functional materials may be surfactants, emulsifying agents, binders (e.g., polyvinylidene fluoride (PVDF)), a metal, a metal oxide, a metal alloy, and/or a carbonaceous material. The functional materials may be organic and/or inorganic functional materials. Example metals include, but are not limited to, copper, aluminum, iron, cobalt, nickel, zinc, vanadium, chromium, titanium, manganese, silver, platinum, gold, tantalum, tungsten, palladium, lead, antimony, tin, and/or gallium. Example metal oxides include, but are not limited to, $SiO_2$, $HfO_2$, $Fe_2O_3$, $Fe_3O_4$, $V_2O_5$, $TiO_2$, $WO_2$, $VO_2$, $ZrO_2$, $Al_2O_3$, $Cr_2O_3$, $Er_2O_3$, $Ni_2O_3$, $W_2O_3$, $V_2O_3$, $VO$, $ZnO$, $NiO$, $CaO$, $FeO$, $RuO_2$, $MnO_2$, $Co_3O_4$, $SnO_2$, and/or $In_2O_3$. Example metal alloys include, but are not limited to, stainless-steel, bronze, brass, alnico, nichrome, ferroalloys (e.g., ferrochromium, ferromanganese, ferromolybdenum, ferronickel, ferrosilicon, ferrotitanium, ferrotungsten, ferrovanadium), fernico, kanthal, and/or alumel. Example carbonaceous materials include, but are not limited to, graphite, and/or grapheme. The tape-casting apparatus 100 may further include a doctoring member 160 that extends in a second direction traversing the first direction and is positioned above the surface of the substrate 120. In some embodiments, the doctoring member 160 may be a doctor blade. The second direction may be perpendicular to the first direction or may form an acute angle with the first direction. In some embodiments, the doctoring member may be spaced apart from the surface of the substrate by a predetermined distance (e.g., greater than about 0.01 mm). For example, the predetermined distance between the doctoring member 160 and the surface of the substrate 120 may be in a range of about 0.01 mm to about 10,000 mm.

Figure 3A:
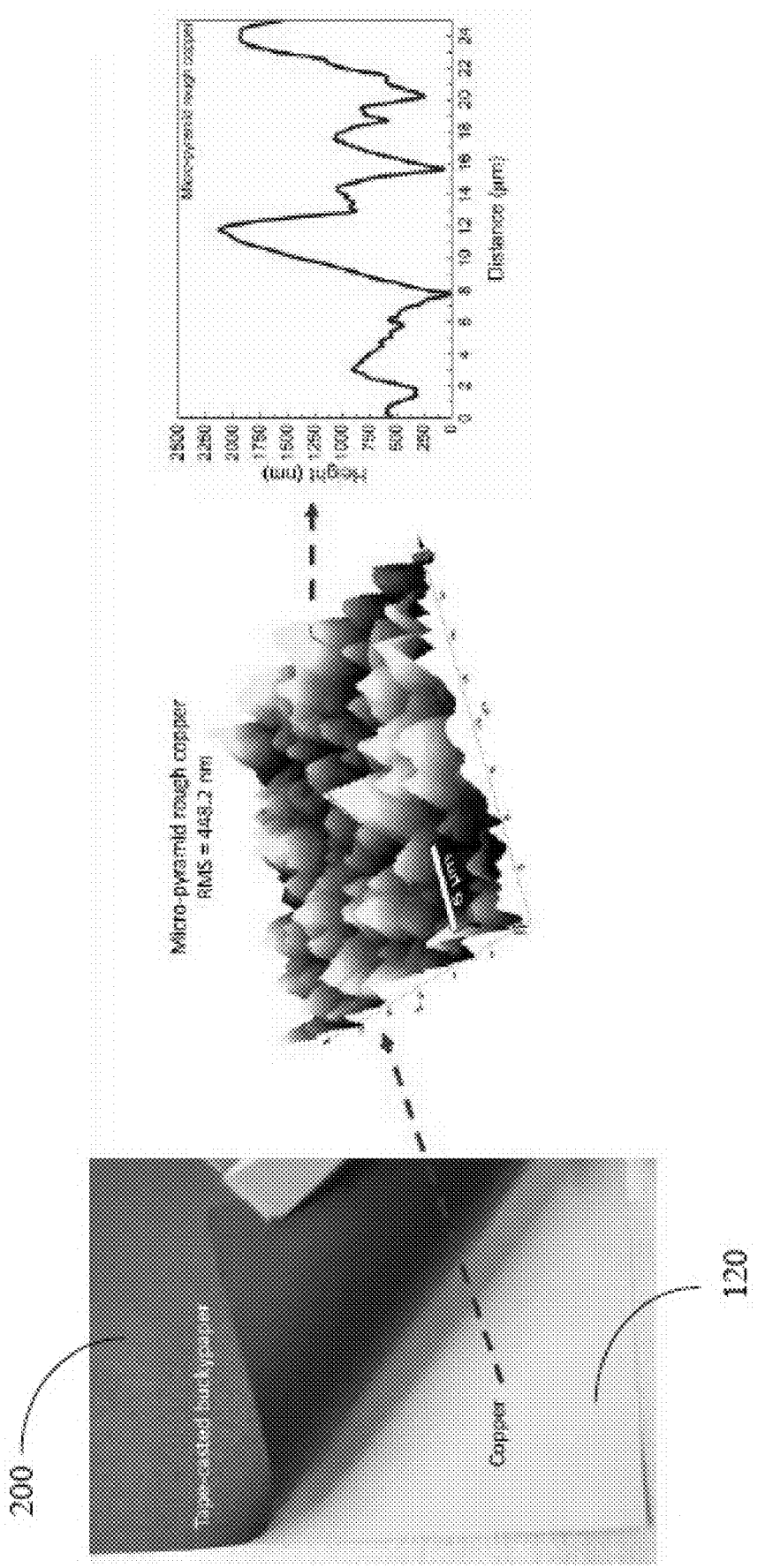
FIGS. 3A and 3B show example substrates according to some embodiments of the present invention.
Figure 3B:
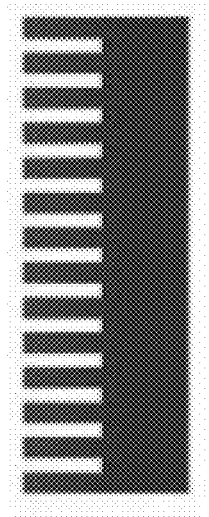
Figure 3B:
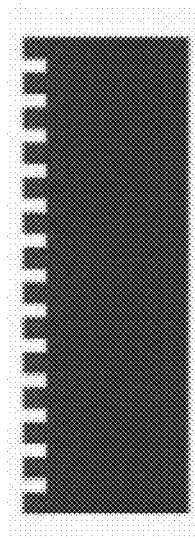
Figure 3B:
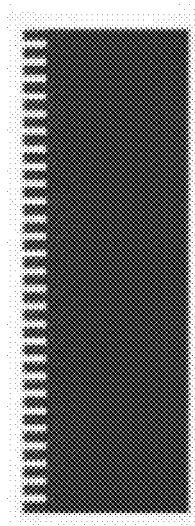
Figure 4:
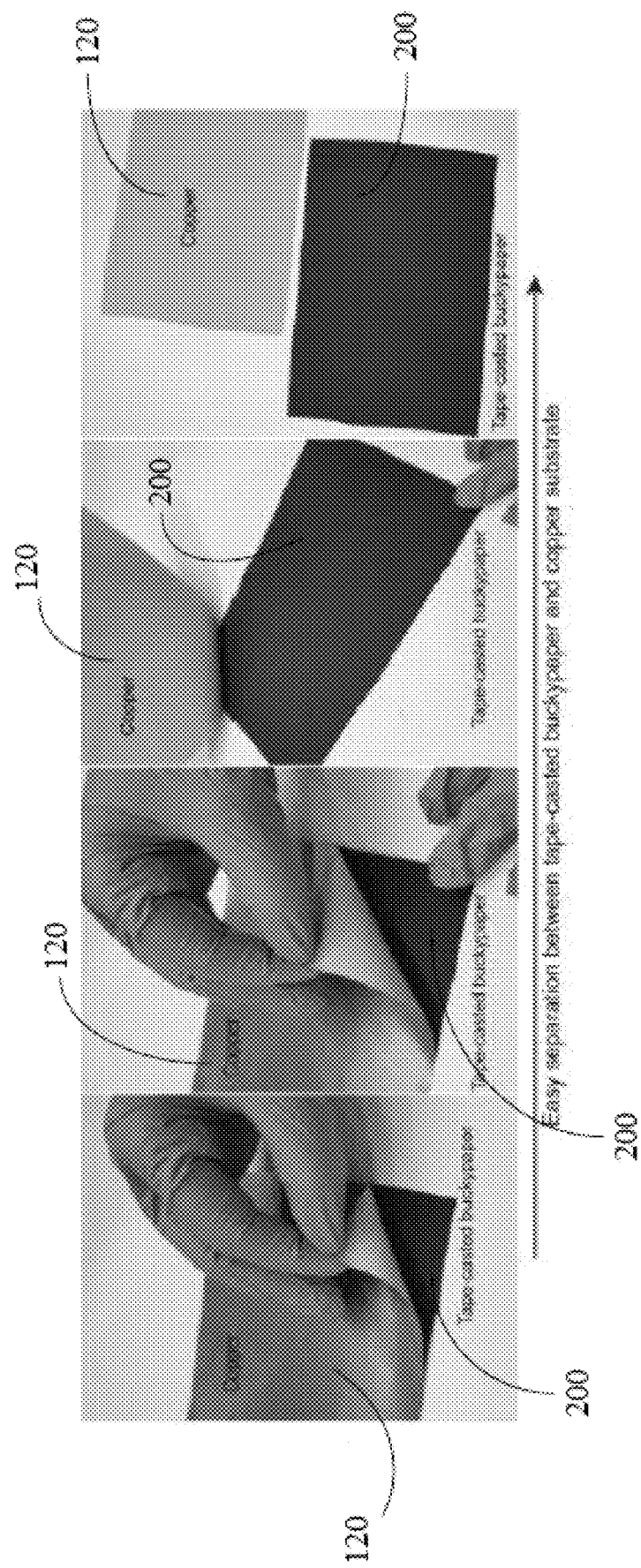
FIG. 4 shows the separation of a tape-casted carbon nanostructure sheet from a substrate according to some embodiments of the present invention.

FIG. 3A shows a substrate 120 having a micro-pyramid-structured surface according to some embodiments of the present invention, and FIG. 3B shows cross-sections of micro-pillar-structured substrates 120. FIG. 4 shows a separation of a tape-casted carbon nanostructure sheet 200 from a substrate 120 according to some embodiments of the present invention. The surface of the substrate 120 may include or may be formed of a material having a high surface energy. The surface energy of the surface of the substrate 120 may be greater than 45.3 $mNm^{-1}$. In some embodiments, the surface energy of the surface of the substrate 120 may be greater 300 $mNm^{-1}$. For example, the surface energy of the surface of the substrate 120 may be in a range of about 300 $mNm^{-1}$ to about 8500 $mNm^{-1}$. In some embodiments, the substrate 120 may include or may be formed of a flexible or a rigid metal, a metal alloy and/or a metal oxide (e.g., copper foil, copper sheet, copper laminated material, copper laminated polymer), a polymeric material, a glass and/or a glass laminated polymer. The substrate 120 may have a preformed shape and may have a flat edge and/or a beveled edge. Thus, tape-casted carbon nanostructure sheets 200 may have a shape corresponding to the substrate 120 used. For example, tape-casted carbon nanostructure sheets 200 may be in the form of a round shape (see FIG. 2E), a rectangular shape (see FIG. 2F), a U-shape (see FIG. 2G), a perforated square shape (see FIG. 2H, a tube shape, a mesh shape and an I-shape. In some embodiments, the surface of the substrate 120 may include a patterned (e.g., visibly patterned) or textured surface (e.g., a hammered, slotted and/or perforated surface, a surface having serpentine stripes and/or quatrefoil shapes) or a non-patterned surface (e.g., a flat surface). In some embodiments, the surface of the substrate 120 may include a microscopic patterned surface (e.g., a micro-pyramid-structured surface as shown in FIG. 3A, a micro-pillar-structured surface as shown in FIG. 3B) or a microscopic non-patterned surface (e.g., a smooth and/or polished surface). A height of micro-pyramids or micro-pillars of the surface of the substrate 120 may be, for example, in a range of about 500 nm to about 2500 nm and a distance between adjacent micro-pyramids or micro-pillars may be, for example, in a range of about 1000 nm to 3000 nm. A microscopic patterned surface of the substrate 120 may make separation of a carbon-nanostructure sheet from the substrate 120 easier as illustrated in FIG. 4. In some embodiments, the surface of the substrate 120 may have a root mean squared roughness value (a RMS roughness value) in a range of about 150 to about 500 nm. In some embodiments, the surface of the substrate 120 may have a RMS roughness value of greater than or equal to 448 nm.

Referring again to FIG. 2A, the slurry reservoir 140 may include a mixing/homogenizing device 142 including one or more mixing devices 143 and/or homogenizers 145. The mixing/homogenizing device 142 may include a mixing member, a sonicator, an agitator and/or a shaker. The mixing devices 143 and the homogenizers 145 may be configured to operate simultaneously or separately. In some embodiments, the mixing devices 143 and the homogenizers 145 may be configured to operate sequentially. It will be understood that "operate simultaneously" refers to operate at approximately (but not necessarily exactly) the same time. The slurry reservoir 140 may include multiple inlets 146.

In some embodiments, the slurry reservoir 140 and/or the mixing/homogenizing device 142 may be connected to external vacuum lines 148 for degassing of the slurry.

Degassing of the slurry may at least partially remove bubbles in the slurry. In some embodiments, the slurry reservoir 140 and/or the mixing/homogenizing device 142 may include degassing devices 149 for degassing of the slurry. For example, the degassing devices 149 may include vacuum generators. In some embodiments, the degassing devices 149 may be in the slurry reservoir 140 and/or the mixing/homogenizing device 142 and may be connected to the external vacuum lines 148. For example, degassing of the slurry may be carried out under pressure of less than 0.01 mbar using external vacuum generators connected to the external vacuum lines 148 or the degassing devices 149. Degassing of the slurry may be carried out for about 1 second or more (e.g., about 1 minute) at temperature of about room temperature or above (e.g., 80° C.). In some embodiments, the mixing device 143 may be connected to the external vacuum line 148 and/or may include the degassing devices 149. Degassing of the slurry may be carried out after mixing and sonication are completed. In some embodiments, degassing of the slurry may be carried out simultaneously with mixing and sonication.

In some embodiments, the tape-casting apparatus 100 may also include a dryer 170 and/or a press 180. The dryer 170 may include a heating element and may include a pressure dryer, an ambient pressure dryer, and/or a vacuum dryer. The dryer 170 may be configured to operate at a temperature greater than or equal to room temperature under a pressure (e.g., a pressure greater than or equal to 1 atm) or under vacuum (e.g., evacuation to a pressure of less than 0.01 mbar) for about 5 seconds or more (e.g., about 10 minutes). A drying process may be performed using batch drying and/or conveyor drying. The press 180 may be configured to operate at a temperature greater than or equal to room temperature under a pressure (e.g., a pressure greater than or equal to 1 Pa) for about 5 seconds or more (e.g., about 10 minutes). In some embodiments, the press 180 may be configured to apply a pressure (e.g., a pressure greater than or equal to 1 Pa for about 5 seconds or more (e.g., about 10 minutes).

In some embodiments, the dryer 170 may be a drying/pressing device, and the press 180 may be omitted. The drying/pressing device may be configured to apply both heat and pressure and may be configured to operate at a temperature greater than or equal to room temperature under a pressure (e.g., a pressure greater than or equal to 1 atm) or under vacuum (e.g., evacuation to a pressure of less than 0.01 mbar) for about 5 seconds or more (e.g., about 10 minutes). The tape-casting apparatus 100 may further include a roll 190 that may be configured to roll carbon nanostructure sheets.

In some embodiments, the dryer 170 may include a freezer and a freeze drying apparatus to achieve freezing of the sheets by decreasing the temperature below the freezing point of the solvent, followed by degassing of the dryer compartment to a low pressure and allowing for sublimation of the frozen solvent crystals directly into the vapor phase. The freezer may be configured to achieve rapid, medium, or slow rates of cooling, and can be operated to achieve partial or full freezing of the sample. The vacuum may be configured to achieve slow, medium, or rapid degassing to achieve low or high vacuum and can be operated for a time between 1 minute and 48 hours.

Carbon nanostructure sheets prepared using a tape-casting apparatus 100 and/or methods according to some embodiments of the present invention below may improve properties to carbon nanostructure sheets prepared using a membrane filtration method. The carbon nanostructure sheets may include carbon nanostructures. In some embodiments, the carbon nanostructures are carbon nanotubes. The carbon nanostructures may have directionality and may be aligned in a direction. The direction may be a direction parallel to or perpendicular to a longitudinal direction of the carbon nanostructure sheets or a direction forming an angle with a longitudinal direction of the carbon nanostructure sheets. The carbon nanostructure sheets may have different mechanical, electrical and/or thermal properties that correspond to a direction with which the carbon nanostructures are aligned.

In some embodiments, sheets prepared using a tape-casting apparatus 100 and/or methods according to some embodiments of the present invention may be a carbon nanostructure composite that includes additional material(s) besides carbon nanostructures, and optionally may be a carbon nanostructure-functional material composite, that includes functional materials besides carbon nanostructures and may be referred to as "carbon nanostructure-functional material composite sheets."

Figure 5B:
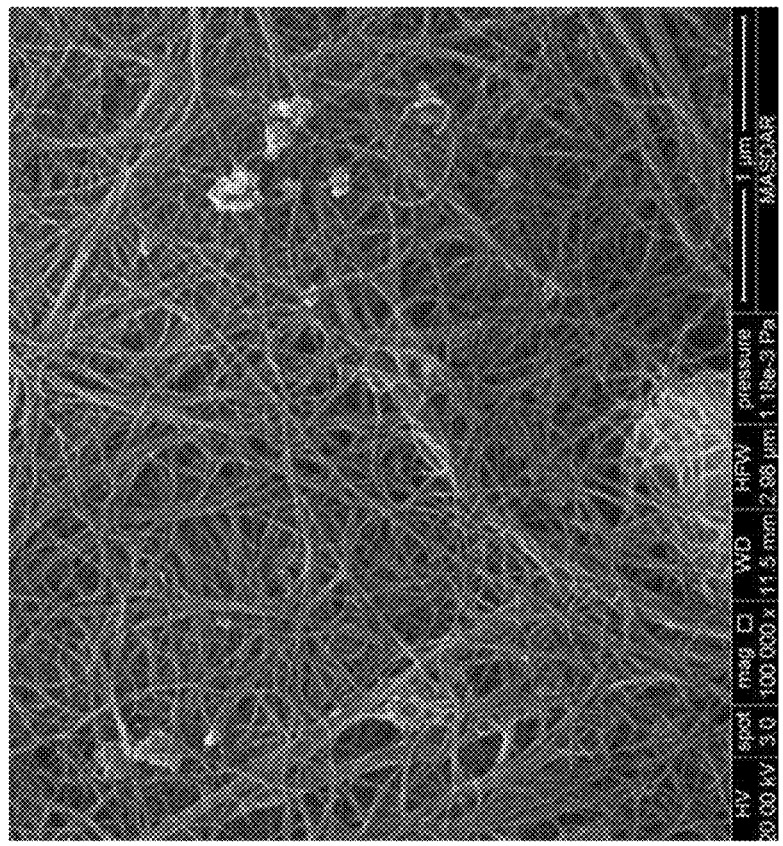
FIGS. 5A and 5B are Scanning Electron Microscope (SEM) images of carbon nanostructure sheets prepared by conventional methods.
Figure 5A:
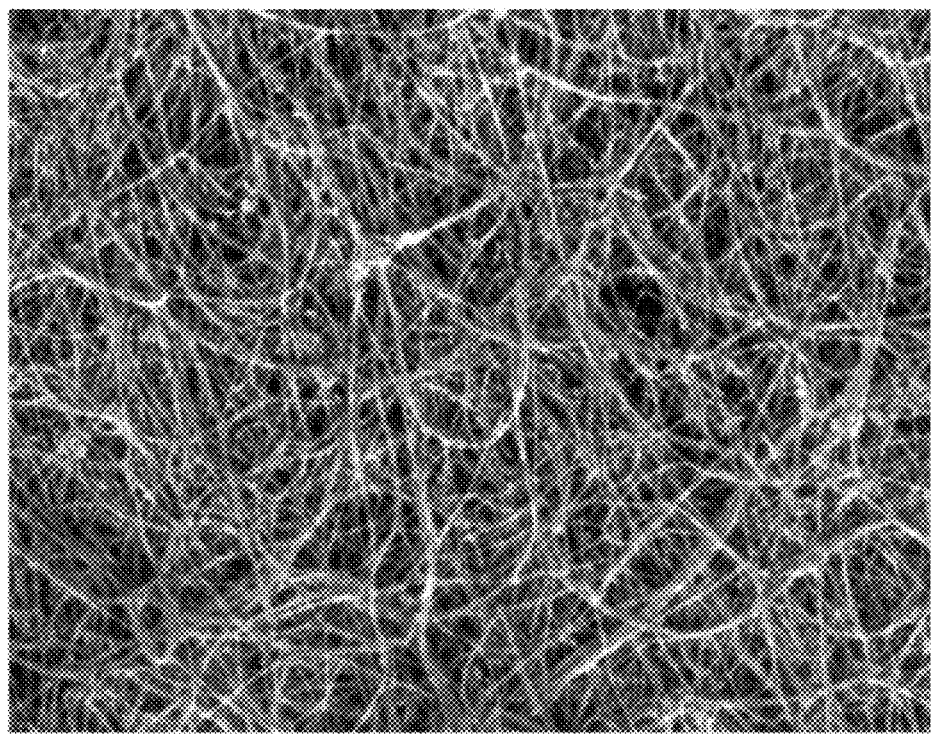

FIG. 5A and FIG. 5B are Scanning Electron Microscope (SEM) images of carbon nanostructure sheets prepared by conventional methods. FIG. 5A is a SEM image of a carbon nanostructure sheet prepared by a CVD process from Nanocomp Technologies, USA, and there are no alignments of carbon nanotubes. FIG. 5B is a SEM image of a multi-walled carbon nanotube sheet prepared by a membrane filtration method. The multi-walled carbon nanotubes are supplied by Applied NanoStructured Solutions, USA. There is much less alignment compared to multi-walled carbon nanotube sheets shown in FIG. 6, which are prepared by tape-casting methods according to some embodiments of the present invention.

Figure 6:
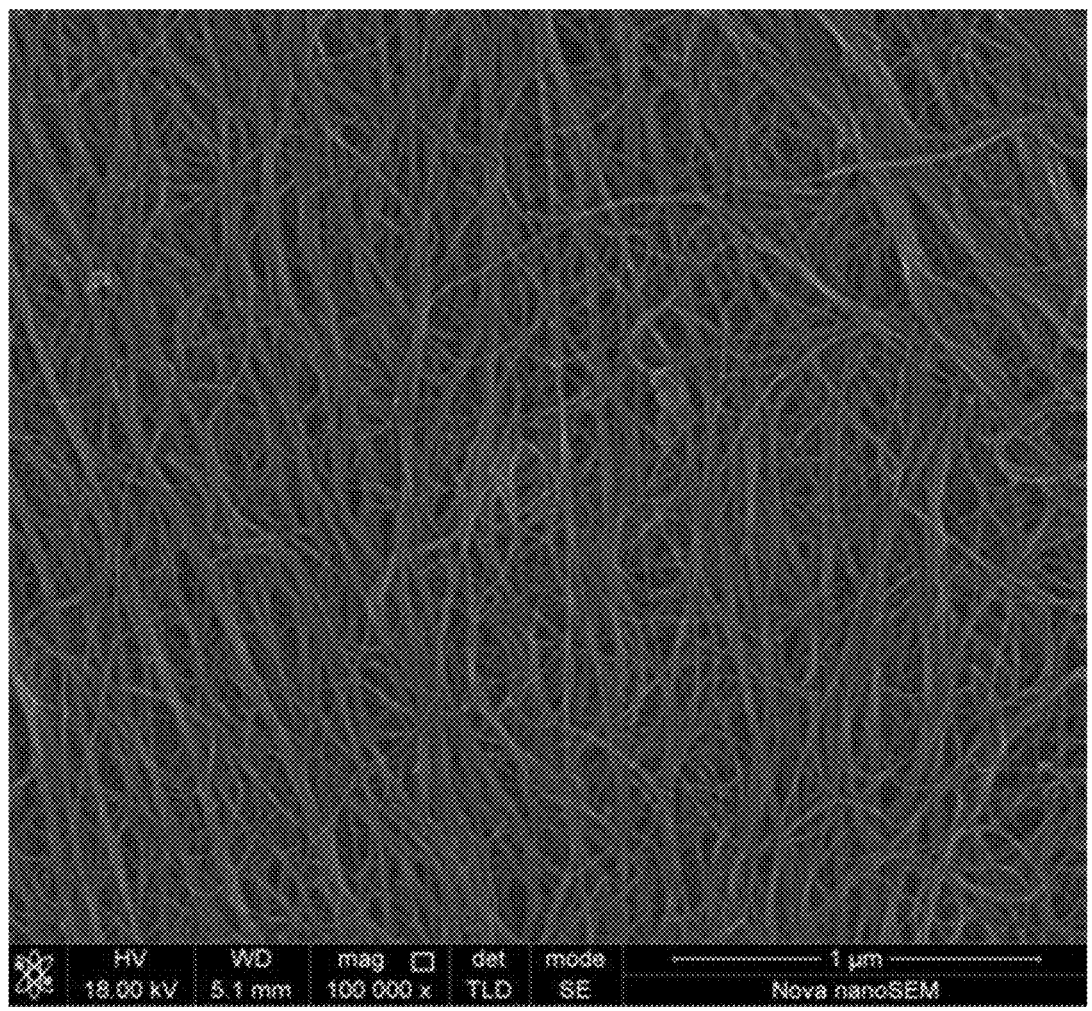
FIG. 6 is a SEM image of multi-walled carbon nanotube sheets prepared by a tape-casting method according to some embodiments of the present invention.

FIG. 6 is a SEM image of multi-walled carbon nanotube sheets prepared by a tapecasting method according to some embodiments of the present invention. The multi-walled carbon nanotubes are supplied by Applied NanoStructured Solutions, USA, the same supplier as the supplier for the carbon nanotubes of FIG. 5B. The multi-walled carbon nanotubes are well aligned as shown in FIG. 6. The multi-walled carbon nanotube sheets can be fabricated to achieve a wide and tunable range of pore sizes (nano, micro, and milli) prepared by a tape casting method according to some embodiments of the present invention.

Figure 7B:
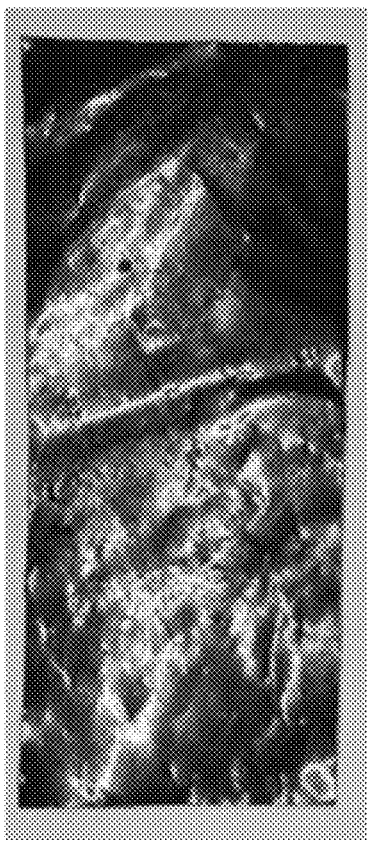
FIG. 7B shows a carbon nanostructure sheet having a glossy (mirror-like) finish.
Figure 7A:
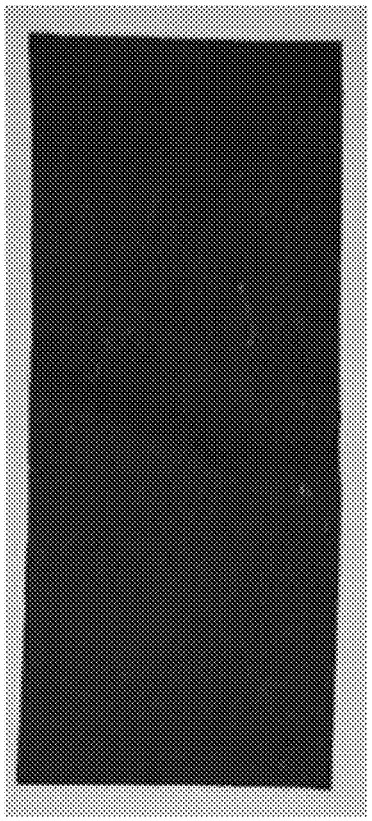
FIG. 7A shows a carbon nanostructure sheet having a matt finish.

Carbon nanostructure sheets prepared using apparatuses and/or methods according to some embodiments of the present invention may have a matt finish as shown in FIG. 7A or a glossy (mirror-like) finish as shown in FIG. 7B.

Carbon nanostructure sheets prepared using apparatuses and/or methods according to some embodiments of the present invention may have at least one property (e.g., thickness, electrical conductivity, geometric area, etc.) that is increased compared to a carbon nanostructure sheet prepared using a membrane filtration method.

Carbon nanostructure sheets prepared using apparatuses and/or methods according to some embodiments of the present invention may have an electrical conductivity in a range of about $2 \times 10^3$ to about $2 \times 10^5$ $Sm^{-1}$. The carbon nanostructure sheets may have a thickness of about 10 μm or greater. For example, the carbon nanostructure sheets may have a thickness in a range of about 10 μm to about 1 cm. The thickness of the carbon nanostructure sheets may vary by less than about 10%. The carbon nanostructure sheets may have a density of about 0.3 $gcm^{-3}$ or greater. For example, the carbon nanostructure sheets may have a density in a range of about 0.3 $gcm^{-3}$ to about 1.2 $gcm^{-3}$. In some embodiments, a density of the carbon nanostructure sheets may be 1.9398 $gcm^{-3}$.

The carbon nanostructure sheets may have a tensile strength in a range of about 2 to about 20 MPa. The carbon nanostructure sheets may have a Young's modulus in a range of about 50 to about 500 MPa. The carbon nanostructure sheets may have a geometric area of at least about 75 $cm^2$ and may have a width of at least about 1.37 m. In some embodiments, the width of the carbon nanostructure sheets may be in a range of about 1.37 m to about 1000 m.

The carbon nanostructure sheets may include carbon nanotubes. In some embodiments, the carbon nanostructure sheets may include multi-walled carbon nanotubes, single-walled carbon nanotubes, and/or double-walled carbon nanotubes. In some embodiments, the carbon nanostructure sheets may also include functional materials at a weight concentration in a range of about 0.1% to about 99.9% of the carbon nanostructure sheets. In some embodiments, the functional materials may include surfactants, emulsifying agents, binders (e.g., polyvinylidene fluoride (PVDF)), metals, a metal oxide and/or a metal alloys. The functional materials may be organic and/or inorganic functional materials. The carbon nanostructure sheet may be formed using carbon nanostructure composite precursors that may be provided by different suppliers or a single supplier. The carbon nanostructure composite precursors may be carbon nanotube powder, flakes and/or pellets.

Devices according to some embodiments of the present invention may include a carbon nanostructure sheet prepared using an apparatus and/or a method of the present invention. The device may be a battery, a component for energy storage of a battery, a supercapacitor, a fuel-cell, an electrolyzer, a flexible and/or wearable device, a flame resistant and/or flame retardant device, a heater, a heat sink device, a water desalination device, a water-oil separation device, a lightening protection device, a EMI shielding device, a CNT-polymer composite device, a sensor, a switches device, a dosimeter, a water purification device, and/or a drug-delivery device. The carbon nanostructure sheet may be used as, for example, an electrode or a membrane of a water purification device. A specific capacity of the device may vary according to a mass of the carbon nanostructure sheets and the functional materials in the carbon nanostructure sheets.

Figure 8:
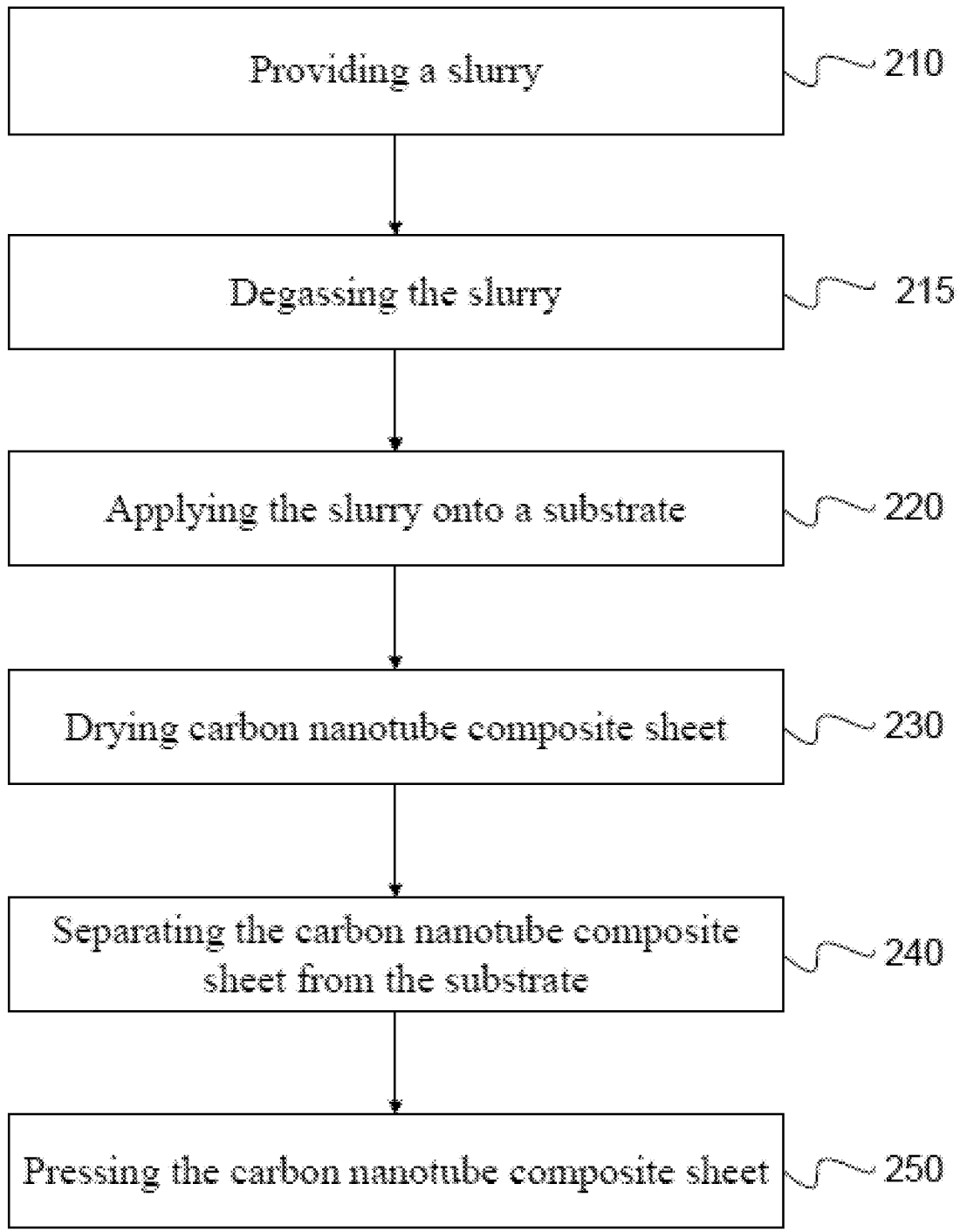
FIG. 8 is a flowchart illustrating a method of preparing a carbon nanostructure sheet according to some embodiments of the present invention.

FIG. 8 is a flowchart illustrating a method of preparing a carbon nanostructure sheet according to some embodiments of the present invention. Referring to FIG. 8, a method of preparing a carbon nanostructure sheet according to some embodiments of the present invention may include providing a slurry (Block 210) and applying (e.g., tape-casting) the slurry (Block 220) onto a surface of a substrate. The method may optionally include degassing the slurry (Block 215) before apply the slurry onto surface of the substrate. The slurry may include carbon nanostructures. The carbon nanostructures may include multi-walled carbon nanotubes, single-walled carbon nanotubes, and/or double-walled carbon nanotubes. The slurry may also include functional materials (e.g., surfactants, emulsifying agents, binders (e.g., polyvinylidene fluoride (PVDF)), metals, metals oxides and metals alloys) at a weight concentration in a range of about 0.1% to about 99.9% of the carbon nanostructure sheets. The functional materials may be organic and/or inorganic functional materials.

In some embodiments, providing the slurry (Block 210) may include dispersing carbon nanostructures and a dispersion agent in a solvent. Dispersing the carbon nanostructures and the dispersion agent in the solvent may be carried out for about 5 to about 15 minutes. For example, dispersing the carbon nanostructures and the dispersion agent in the solvent may be carried out for about 10 minutes. Dispersing the carbon nanostructures and the dispersion agent in the solvent may include simultaneously mixing and sonicating. Mixing may be carried out at a speed of about 1000 rpm or greater and sonicating may be carried out at an ultrasonic frequency of at least about 20 kHz. In some embodiments, mixing and sonicating may not be performed simultaneously and may be performed sequentially.

In some embodiments, the carbon nanostructures, the dispersion agent, and the solvent may be separately provided into the slurry reservoir 140 through respective multiple inlets 146 (see FIG. 2A).

The solvent may include water and/or an alcohol (e.g., ethanol and/or methanol). In some embodiments, the solvent may include water and/or the alcohol in a ratio by weight in a range of about 75:25 to about 0:100. For example, the solvent may include water and ethanol in a ratio by weight of about 85:15 to about 0:100 or the solvent may include water and methanol in a ratio by weight of about 75:25 to about 0:100.

The dispersion agent may be selected from the group consisting of polyethylene glycol (PEG), sodium dodecylbenzenesulfonate (SDBS), Triton-X 100 ($(C_{14}H_{22}O(C_2H_4O)_n)$), and sodium alginate.

In some embodiments, degassing the slurry (Block 215) may be carried out using, for example, an ultrasonicator and/or vacuum and may at least partially remove bubbles in the slurry. For example, degassing of the slurry may be carried out under pressure of less than 0.01 mbar for about 1 second or more (e.g., about 1 minute) at temperature of about room temperature or above (e.g., 80° C.). Degassing of the slurry may be carried out during and/or after dispersing the carbon nano structures and the dispersion agent.

Applying the slurry onto the surface of the substrate (Block 220) may include spreading the slurry onto the substrate using a doctoring member (e.g., a doctor-blade). The doctoring member may be positioned about 0.01 mm or more above the surface of the substrate. By adjusting a distance between the doctoring member and the surface of the substrate, a thickness of the carbon nanostructure sheet may be adjusted.

The methods may also include drying the carbon nanostructure sheet (Block 230).

Drying may include exposing the carbon nanostructure sheet to air having a temperature greater than or equal to room temperature (e.g., about 100° C. to about 150° C.). In some embodiments, drying the carbon nanostructure sheet may include drying the carbon nanostructure sheet under pressure (e.g., a pressure greater than or equal to 1 atm), ambient pressure, or vacuum (e.g., evacuation to a pressure of less than 0.01 mbar) for about 5 seconds or more (e.g., about 10 minutes). Drying may be performed using batch drying and/or conveyor drying.

The methods may further include separating the carbon nanostructure sheet from the substrate (Block 240). In some embodiments, separating the carbon nanostructure sheet may include mechanically peeling the carbon nanostructure sheet from the substrate as illustrated in FIG. 2A.

In some embodiments, the methods may further include pressing the carbon nanostructure sheet (Block 250). For example, pressing the carbon nanostructure sheet may be performed at a temperature greater than or equal to room temperature under a pressure (e.g., a pressure greater than or equal to 1 Pa) for about 5 seconds or more (e.g., about 10 minutes) and may include applying a pressure greater than or equal to 1 Pa for about 5 seconds or more (e.g., about 10 minutes).

The methods may be a batch or roll-to-roll process or a continuous process. The methods may be devoid of a mould to prepare the carbon nanostructure sheet.

The present invention is explained in greater detail in the following non-limiting EXAMPLES.

EXAMPLES

Example 1

Characterization of Carbon Nanostructure Sheet

Referring again to FIG. 1 and FIG. 2, FIG. 1 shows a geometric area of a carbon nanostructure sheet is limited in all x and y directions when a carbon nanostructure sheet is prepared by a membrane filtration method. In a sharp contrast, FIG. 2A shows that there is no limitation in a length or an area of a carbon nanostructure sheet prepared using a tape-casting technique. A length of carbon nanostructure sheets prepared by tape-casting technique may be scaled-up as long as a slurry is supplied.

Figure 9A:
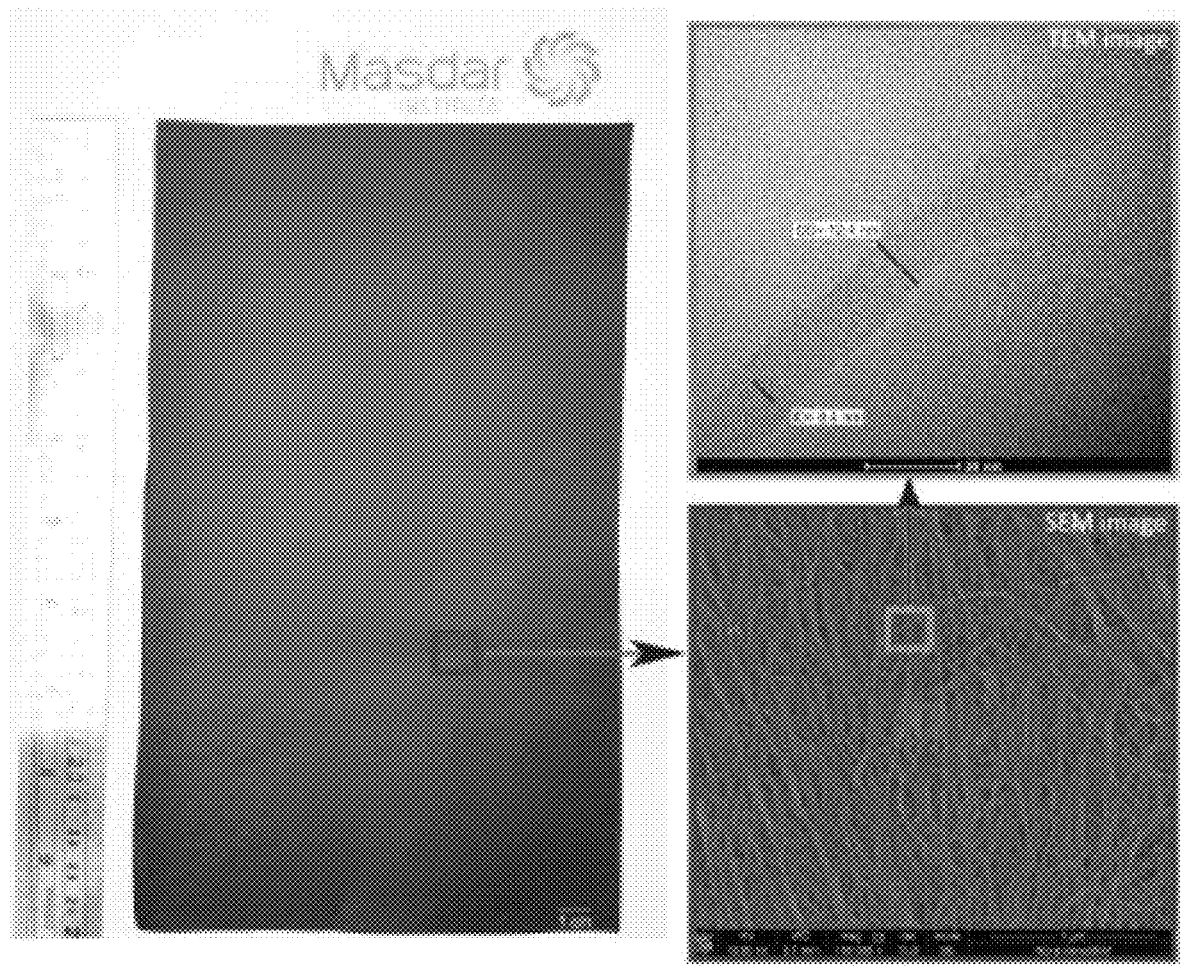
FIGS. 9A-9C show images of tape-casted carbon nanostructure sheets prepared by tape-casting methods according to some embodiments of the present invention.
Figure 9B:
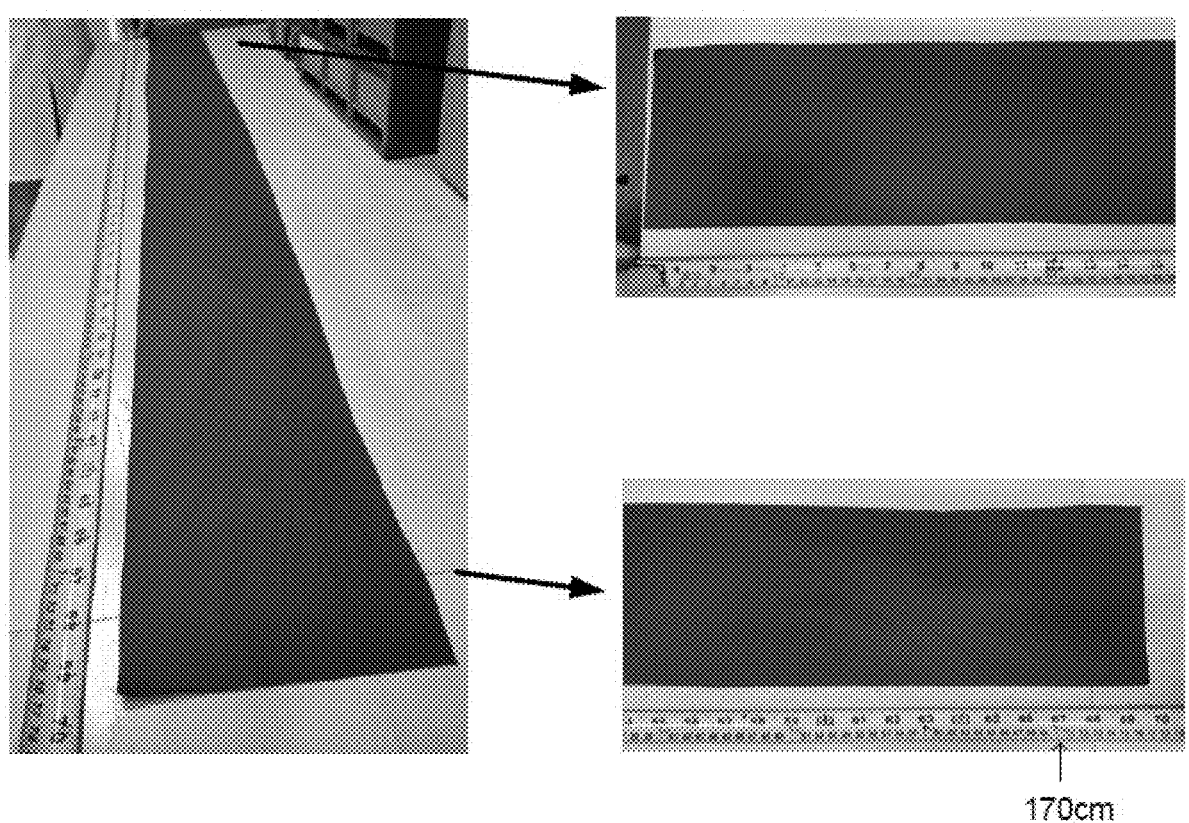
Figure 9C:
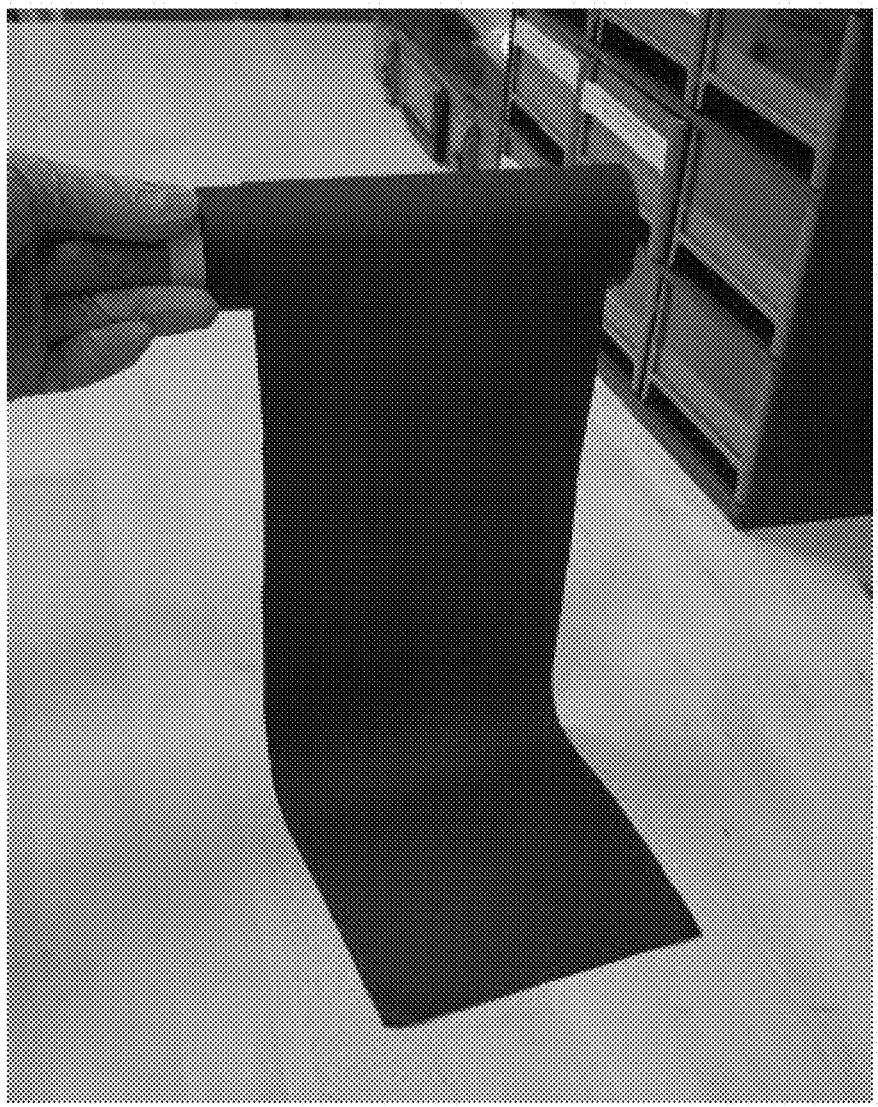

FIGS. 9A-9C shows images of a tape-casted carbon nanostructure sheet. Referring to FIG. 9A, the carbon nanostructure sheet has a relatively large geometric area of 336 cm$^2$ (24 cm length×14 cm width). As a comparison, a carbon nanostructure sheet prepared using a membrane filtration method may be limited to 63.6 cm$^2$ area for a 9 cm diameter of a membrane. The carbon nanostructure sheet is freestanding, flexible and easy to be peeled from the substrate.

The carbon nanotubes are randomly inter-tangled and aligned at local level. The carbon nanotubes are multi-walled carbon nanotubes with outer (inner) diameter of 12.4 (6.4) nm. FIG. 9B and FIG. 9C show images of a tape-casted carbon nanostructure sheet. FIG. 9B shows that the tape-casted carbon nanostructure sheet has a length of greater than 170 cm. The tape-casted carbon nanostructure sheet has a width of 14 cm, and thus the tape-casted carbon nanostructure sheet has a geometric area of approximately 2380 cm$^2$. Referring to FIG. 9C, the tape-casted carbon nanostructure sheet of FIG. 9B can be rolled.

Figure 10A:
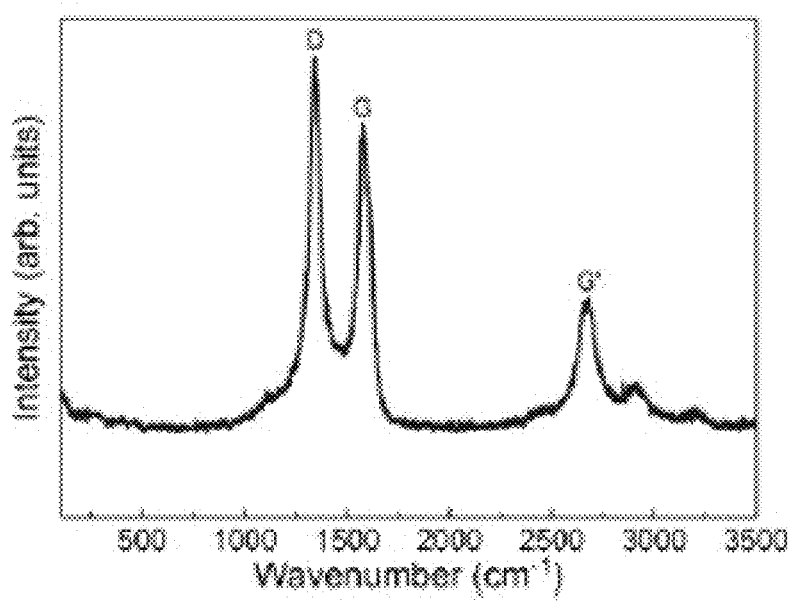
FIGS. 10A-10D are graphs showing properties of the tape-casted carbon nanostructure sheet of FIGS. 9A-9C.
Figure 10B:
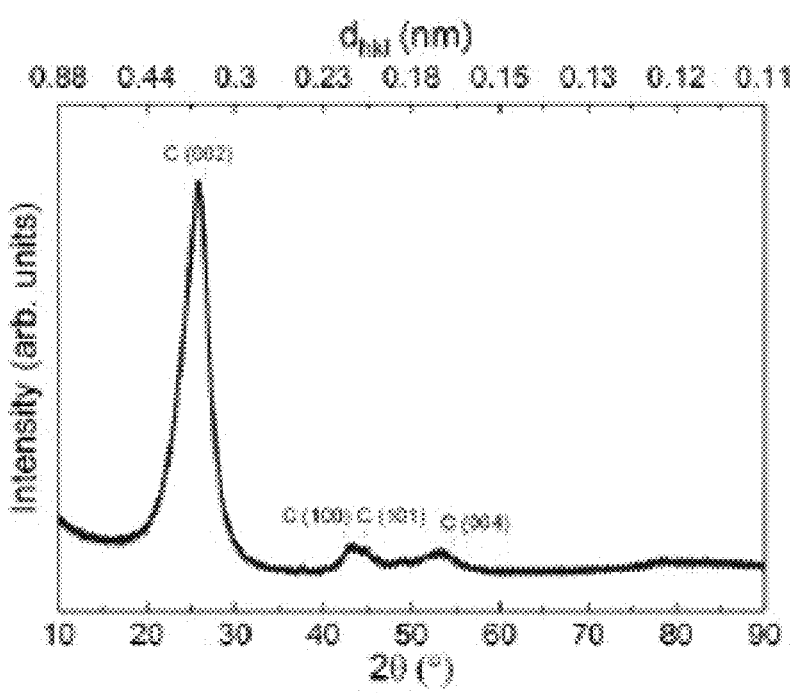
Figure 10C:
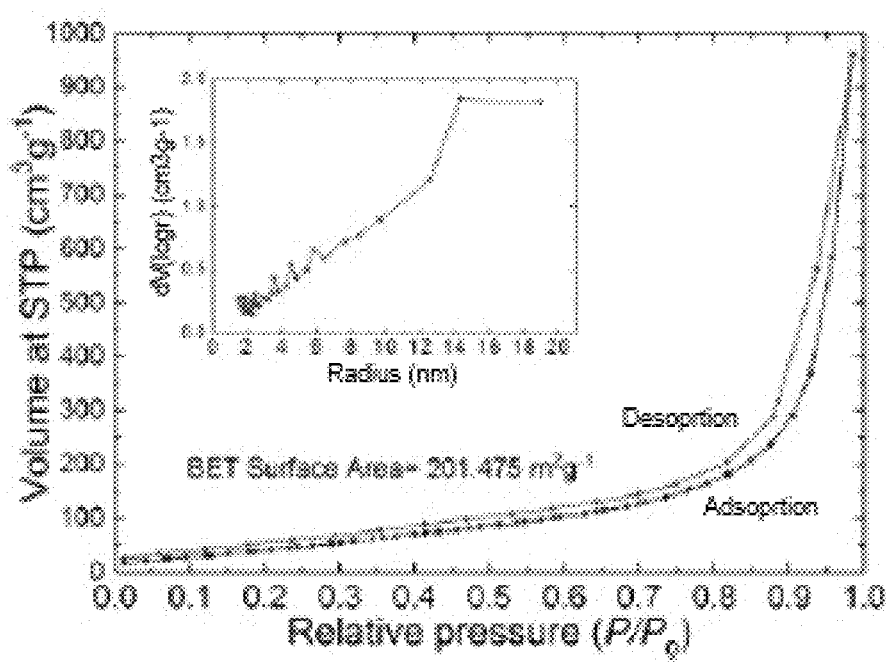
Figure 10D:
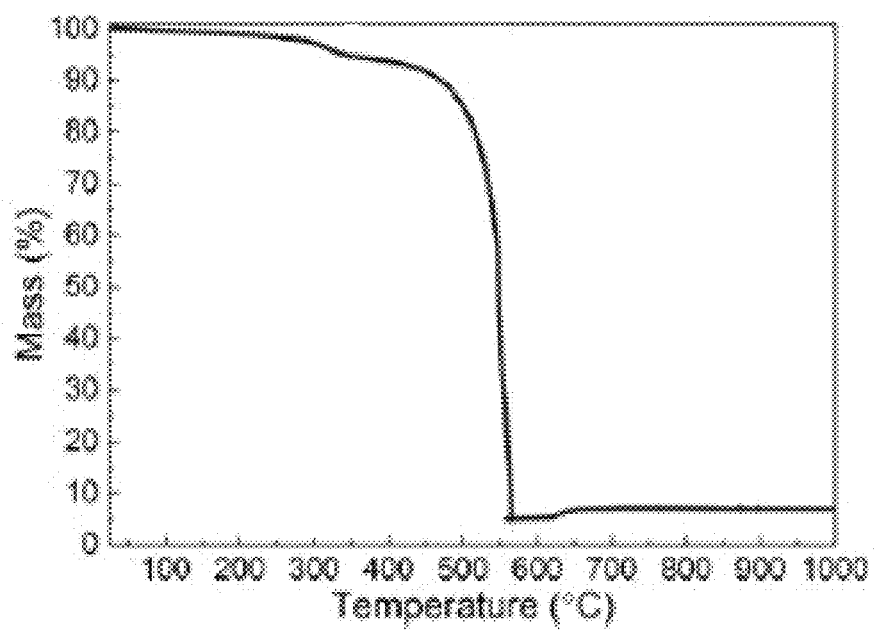

FIGS. 10A-10D and FIGS. 11(A)-11(D) are graphs showing properties of the tape-casted carbon nanostructure sheet of FIG. 9. Raman spectra of FIG. 10A indicates a rather high defect density of carbon nanotubes presumably from branching and cross-linking of the carbon nanotubes. FIG. 10B shows the X-ray diffraction (XRD) spectra of carbon nanostructure sheet almost matched with graphitic carbon (reference code=00-056-0159). Brunauer-Emmett-Teller (BET) measurement at FIG. 10C shows a large surface area of carbon nanostructure sheet of 201.475 m$^2$g$^{-1}$. Barrett-Joyner-Halenda (BJH) analysis indicated mesoporosity dominated by pores of about 14 nm in radius, which can be ascribed to regions and channels between adjacent multi-walled carbon nanotubes being filled with nitrogen. FIG. 10D shows the thermal gravimetric analysis (TGA) curve of the carbon nanostructure sheet in pure oxygen environment. The carbon nanostructure sheet is stable up to 566.3° C., in which the mass decreased to 5.3 wt %.

Figure 11A:
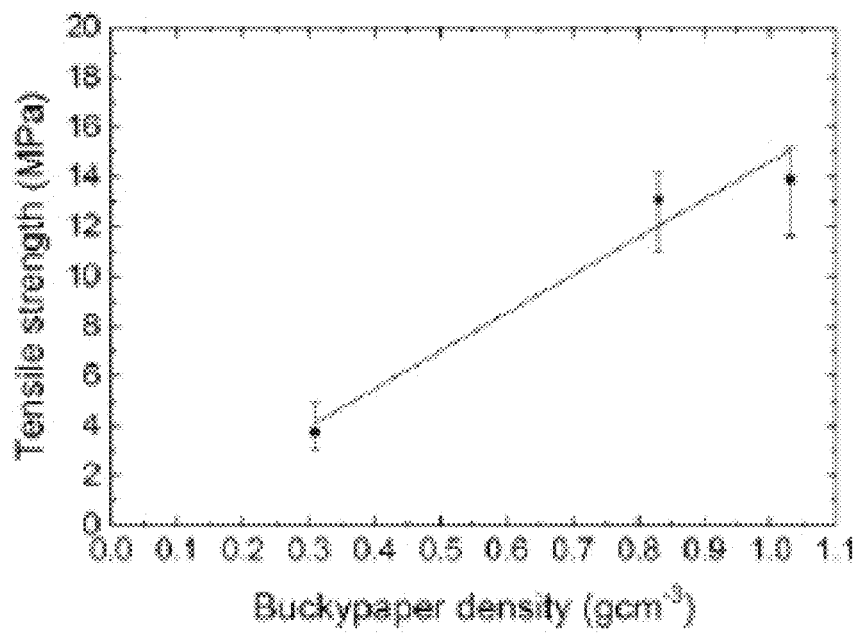
FIGS. 11A-11D are graphs showing properties of the tape-casted carbon nanostructure sheet of FIGS. 9A-9C.
Figure 11B:
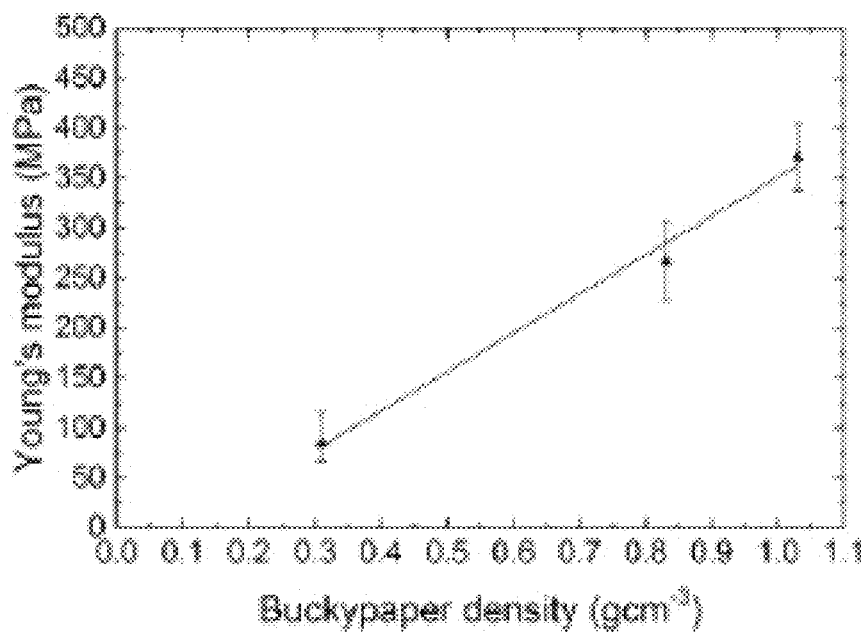
Figure 11C:
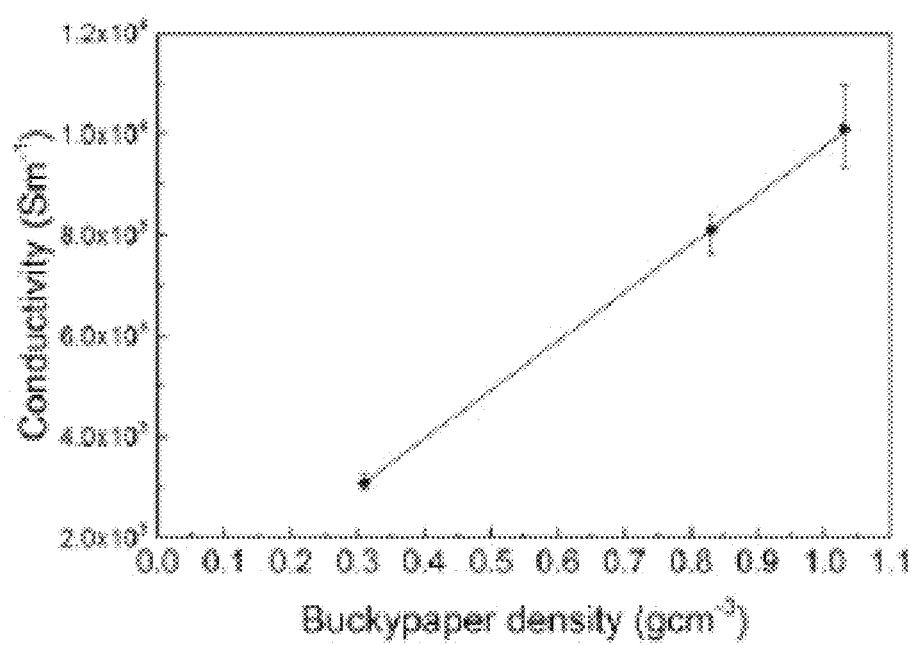
Figure 11D:
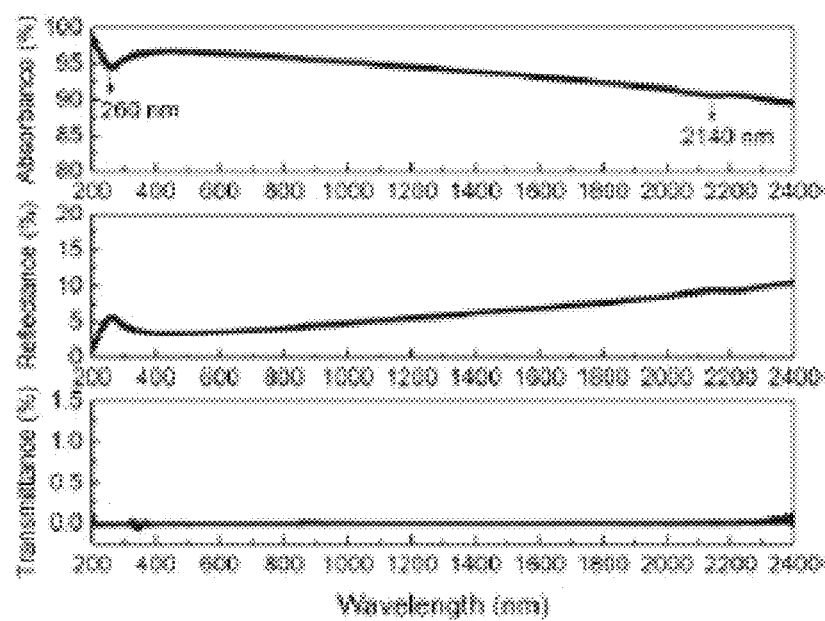

FIG. 11A shows that the carbon nanostructure sheet has a tensile strength of 3.77, 13.09 and 13.90 MPa for its density of 0.31, 0.83 and 1.03 gcm$^{-3}$, respectively. FIG. 11B shows a similar trend for Young's modulus of 84.78, 267.13 and 371.38 MPa for its density of 0.31, 0.83 and 1.03 gcm$^{-3}$, respectively. FIG. 11C shows the carbon nanostructure sheet has electrical conductivity of $3.08 \times 10^3$, $8.11 \times 10^3$ and $1.01 \times 10^4$ Sm$^{-1}$ for its density of 0.31, 0.83 and 1.03 gcm$^{-3}$, respectively. FIG. 11D shows that the transmittance of the matt-finish carbon nanostructure sheet is almost zero, the reflectance is below 11%, and the absorbance is more than 89% in the wavelength ranging from 200 nm to 2400 nm. There are two transition points at 2140 and 260 nm, which correspond to optical bandgap energies of 0.58 and 4.77 eV that are attributed to multi-walled carbon nanotubes and glass fiber, respectively.

Example 2

Scalable Preparation of Carbon Nanostructure—LiFePO$_4$ Sheet

Figure 12A:
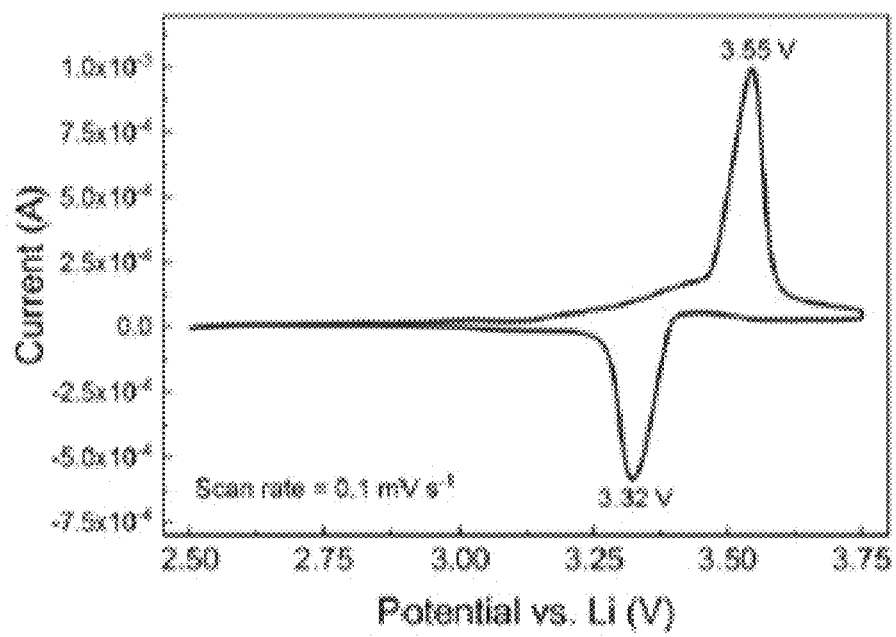
FIGS. 12A-12D are graphs showing properties of the carbon nanostructure—LiFePO$_4$ sheet.
Figure 12B:
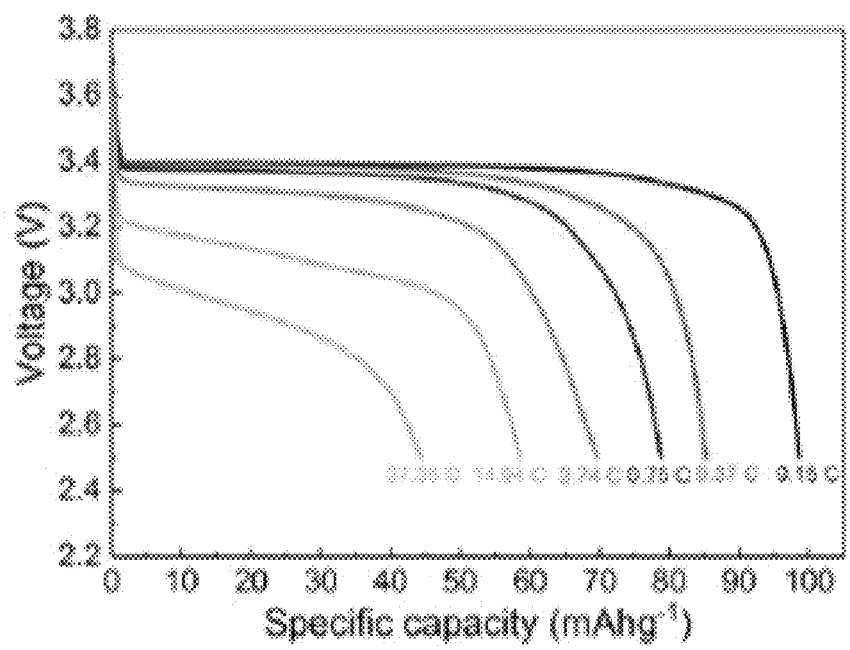
Figure 12C:
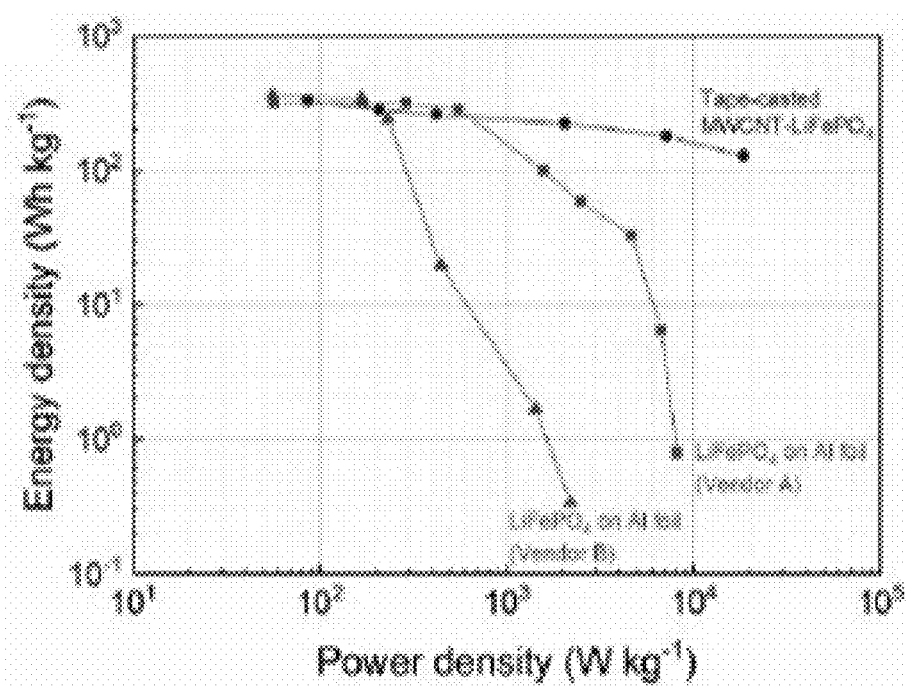
Figure 12D:
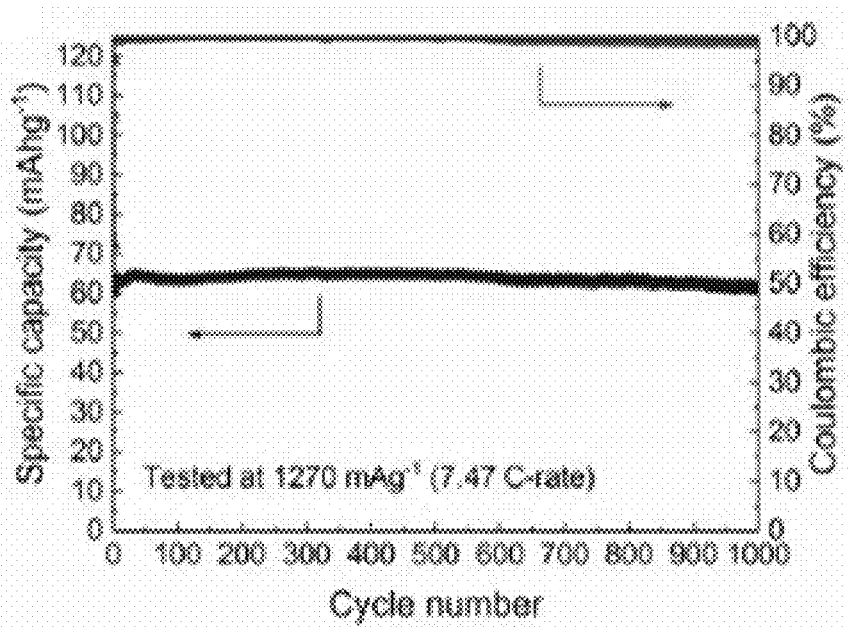

FIGS. 12A-12D are graphs showing properties of the carbon nanostructure—LiFePO$_4$ sheet. FIG. 12A shows the cyclic voltammetry of carbon nanostructure—LiFePO$_4$ composite sheet with lithiation and delithiation peaks at 3.55 and 3.32 V with respect to the lithium reference, respectively. The peak potential difference of 0.23 V is similar to 0.22 V reported in the literature[9]. This was attributed to the high electrical conductivity of the MWCNT-LiFePO$_4$. FIG. 12B shows a discharge voltage profile of a tape-casted carbon nanostructure-LiFePO$_4$ sheet at different C-rate. The carbon nanostructure-LiFePO$_4$ sheet has discharge specific capacities of 98.61, 85.25, 78.81, 69.63, 58.64 and 44.32 mAhe at 0.15, 0.37, 0.75, 3.74, 14.94 and 37.35 C-rate, respectively. FIG. 12C shows that the carbon nanostructure—LiFePO$_4$ sheet has a superior rate capability compared to conventional cathode of (LiFePO$_4$ on aluminium foil) from two different vendors, MTI Corporation, USA and Custom Cells Itzehoe GmbH, Germany. FIG. 12D shows the carbon nanostructure—LiFePO$_4$ cathode also has a long cycle life with a stable specific capacity of 61.20 mAhg$^{-1}$$_{MWCNT+LiFePO4}$ at 1270 mAg$^{-1}$$_{MWCNT+LiFePO4}$ (7.47 C-rate) for up to 1000 cycles.

Figure 13:
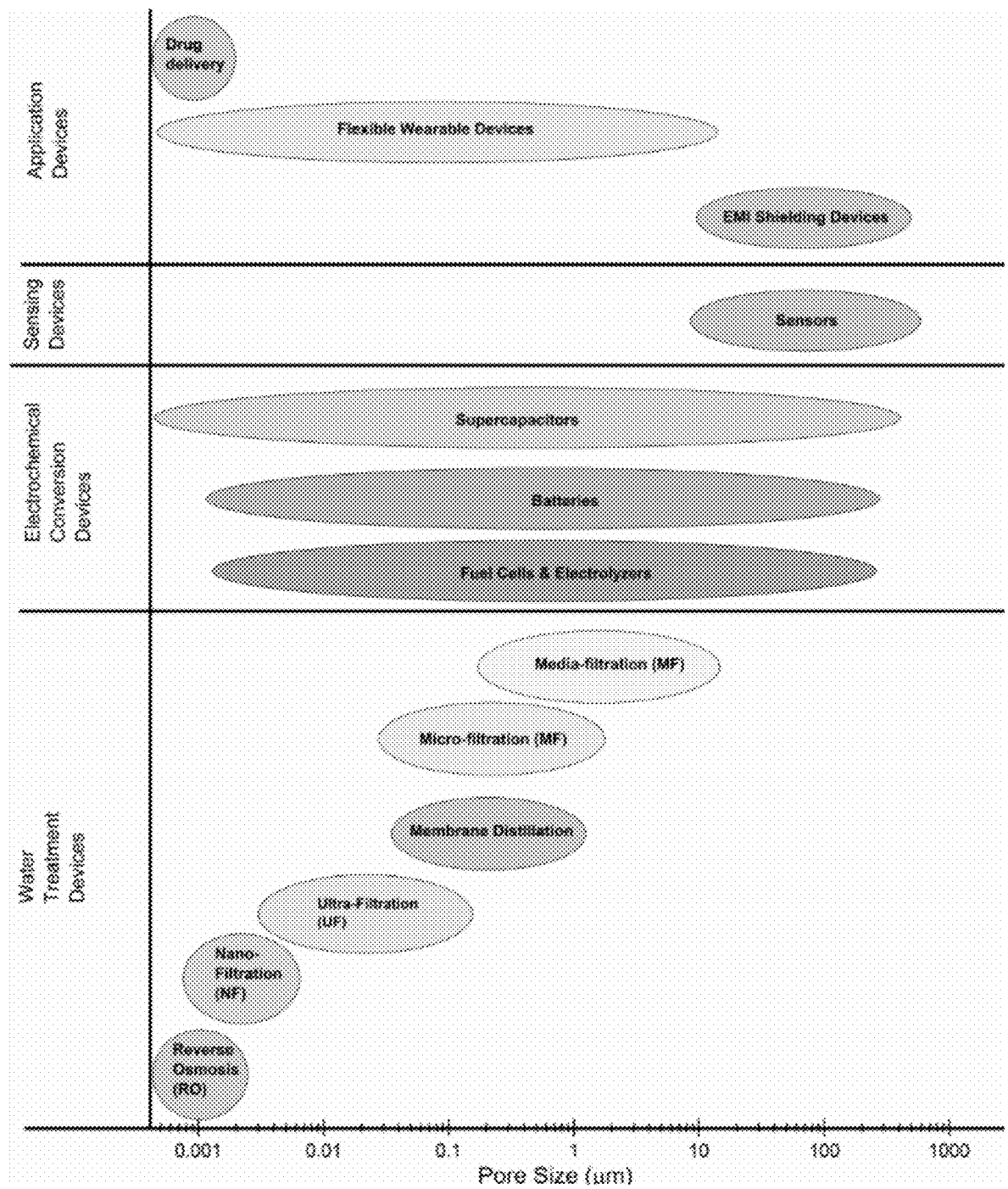
FIG. 13 shows the various applications of tape-casted carbon nanostructure sheets prepared by tape-casting methods according to some embodiments of the present invention.

FIG. 13 shows the various applications of the carbon nanostructure sheets with the different achievable properties depending on pore sizes of the fabricated carbon nanostructure sheet. The carbon nanostructure sheets may be used in water treatment devices including reverse osmosis[10], nano-filtration[10], ultra-filtration[10], microfiltration[10], membrane distillation[11], and media filtration[10]. The carbon nanostructure sheets may be used in electrochemical conversion devices including fuel cells[12], batteries including and not limited to redox flow batteries[13-15] and Lithium batteries[16-17], and supercapacitors[18] and electrolyzers. The carbon nanostructure sheets may be used in sensing devices[19]. The carbon nanostructure sheets may be used in applications including drug delivery[20], flexible wearable devices[21,22], and EMI shielding devices[23]. The carbon nanostructure sheets may be used in many applications including and not limited to the aforementioned and have been reviewed extensively in literature[24-28].

All publications, patent applications, patents, patent publications, and other references cited herein are incorporated by reference in their entireties to the extent they are consistent with the description presented herein.

REFERENCES

[1] M. Endo, H. Muramatsu, T. Hayashi, Y. A. Kim, M. Terrones, and M. S. Dresselhaus, "Nanotechnology: 'Buckypaper' from coaxial nanotubes," *Nature*, vol. 433, no. 7025, pp. 476-476, February 2005.

[2] Y. A. Kim, H. Muramatsu, T. Hayashi, M. Endo, M. Terrones, and M. S. Dresselhaus, "Fabrication of high-purity, double-walled carbon nanotube buckypaper," *Chem. Vap. Depos.*, vol. 12, no. 6, pp. 327-330, 2006.

[3] L. Hussein, G. Urban, and M. Kruger, "Fabrication and characterization of buckypaper-based nanostructured electrodes as a novel material for biofuel cell applications.," *Phys. Chem. Chem. Phys.*, vol. 13, no. 13, pp. 5831-9, 2011.

[4] H. Younes, R. A. Al-Rub, M. Mahfuzur Rahman, A. Dalaq, A. Al Ghaferi, and T. Shah, "Processing and property investigation of high-density carbon nanostructured papers with superior conductive and mechanical properties," *Diam. Relat. Mater.*, vol. 68, no. July, pp. 109-117, 2016.

[5] Z. Wu, Z. Chen, X. Du, J. M. Logan, J. Sippel, M. Nikolou, K. Kamaras, J. R. Reynolds, D. B. Tanner, A. F. Hebard, and A. G. Rinzler, "Transparent, Conductive Carbon Nanotube Films," *Science* (80-.)., vol. 305, no. July, pp. 1273-1277, 2004.

[6] N. A. Kumar, I. Y. Jeon, G. J. Sohn, R. Jain, S. Kumar, and J. B. Baek, "Highly conducting and flexible few-walled carbon nanotube thin film," *ACS Nano*, vol. 5, no. 3, pp. 2324-2331, 2011.

[7] Y.-H. Yun, V. Shanov, M. J. Schulz, S. Narasimhadevara, S. Subramaniam, D. Hurd, and F. J. Boerio, "Development of novel single-wall carbon nanotube-epoxy composite ply actuators," *Smart Mater. Struct.*, vol. 14, no. 6, p. 1526, 2005.

[8] A. Aldalbahi and M. In Het Panhuis, "Electrical and mechanical characteristics of buckypapers and evaporative cast films prepared using single and multi-walled carbon nanotubes and the biopolymer carrageenan," *Carbon N. Y.*, vol. 50, no. 3, pp. 1197-1208, 2012.

[9] Lalia, B. S., Shah, T. & Hashaikeh, R. "Microbundles of carbon nanostructures as binder free highly conductive matrix for LiFePO$_4$ battery cathode," J Power Sources, 278, 314-319, 2015.

[10] Minnesota Rural Water Association Chapter 19: Membrane Filtration, "Minnesota Water Works Operations Manual." 2009.

[11] A. Alkhudhiri, N. Darwish, and N. Hilal, "Membrane distillation: A comprehensive review," Desalination, vol. 287, pp. 2-18, February 2012.

[12] Chung-Lin Ku, "Nanotube Buckypaper Electrodes for PEM Fuel Cell Applications," Thesis, The Florida state university college of engineering.

[13] I. Mustafa, I. Lopez, H. Younes, R. A. Susantyoko, R. A. Al-Rub, and S. Almheiri, "Fabrication of Freestanding Sheets of Multiwalled Carbon Nanotubes (Buckypapers) for Vanadium Redox Flow Batteries and Effects of Fabrication Variables on Electrochemical Performance," Electrochimica Acta, vol. 230, pp. 222-235, March 2017.

[14] I. Mustafa, M. O. Bamgbopa, E. Alraeesi, Y. Shao-Horn, H. Sun, and S. Almheiri, "Insights on the Electrochemical Activity of Porous Carbonaceous Electrodes in Non-Aqueous Vanadium Redox Flow Batteries," J. Electrochem. Soc., vol. 164, no. 14, pp. A3673-A3683, January 2017.

[15] I. Mustafa, A. Al Shehhi, A. Al Hammadi, R. Susantyoko, G. Palmisano, and S. Almheiri, "Effects of carbonaceous impurities on the electrochemical activity of multiwalled carbon nanotube electrodes for vanadium redox flow batteries," Carbon, vol. 131, pp. 47-59, May 2018.

[16] S. Choi, J. Kim, M. Eom, X. Meng, and D. Shin, "Application of a carbon nanotube (CNT) sheet as a current collector for all-solid-state lithium batteries," J. Power Sources, vol. 299, pp. 70-75, December 2015.

[17] A. Nomura, K. Ito, and Y. Kubo, "CNT Sheet Air Electrode for the Development of Ultra-High Cell Capacity in Lithium-Air Batteries," Sci. Rep., vol. 7, p. 45596, April 2017.

[18] T. Chen and L. Dai, "Carbon nanomaterials for high-performance supercapacitors," Mater. Today, vol. 16, no. 7, pp. 272-280, July 2013.

[19] P. Slobodian et al., "Highly Enhanced Vapor Sensing of Multiwalled Carbon Nanotube Network Sensors by n-Butylamine Functionalization," Journal of Nanomaterials, 2014.

[20] J. Wu, K. S. Paudel, C. Strasinger, D. Hammell, A. L. Stinchcomb, and B. J. Hinds, "Programmable transdermal drug delivery of nicotine using carbon nanotube," NCBI, 2010.

[21] S. Roy, M. David-Pur, and Y. Hanein, "Carbon Nanotube-Based Ion Selective Sensors for Wearable Applications," ACS Appl. Mater. Interfaces, vol. 9, no. 40, pp. 35169-35177, October 2017.

[22] C. Shen, Y. Xie, B. Zhu, M. Sanghadasa, Y. Tang, and L. Lin, "Wearable woven supercapacitor fabrics with high energy density and load-bearing capability," Sci. Rep., vol. 7, no. 1, p. 14324, October 2017.

[23] M. Gonzalez, M. Crespo, J. Baselga, and J. Pozuelo, "Carbon nanotube scaffolds with controlled porosity as electromagnetic absorbing materials in the gigahertz range," Nanoscale, vol. 8, no. 20, pp. 10724-10730, May 2016.

[24] R. Malik et al., "Chapter 13—Carbon Nanotube Sheet: Processing, Characterization and Applications," in Nanotube Superfiber Materials, Boston: William Andrew Publishing, 2014, pp. 349-387.

[25] C. de las Casas and W. Li, "A review of application of carbon nanotubes for lithium ion battery anode material," J. Power Sources, vol. 208, pp. 74-85, June 2012.

[26] "Nanostructuring electrodes with carbon nanotubes: A review on electrochemistry and applications for sensing" ScienceDirect.

[27] M. F. L. D. Volder, S. H. Tawfick, R. H. Baughman, and A. J. Hart, "Carbon Nanotubes: Present and Future Commercial Applications," Science, vol. 339, no. 6119, pp. 535-539, February 2013.

[28] Y. Zhao, E. D. Cabrera, J. M. Castro, and L. James Lee, "Chapter 4—Carbon Nanopaper: A Platform to High-Performance Multifunctional Composites," in Nanopapers, W. Huang, Ed. William Andrew Publishing, 2018, pp. 87-120.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope is to be determined by the broadest permissible interpretation of the following claims and their equivalents, and shall not be restricted or limited by the foregoing detailed description.

That which is claimed:

1. An apparatus for preparing carbon nanostructure sheets, the apparatus comprising:
    a casting body including a substrate, the substrate being configured to move along a first direction, wherein the first direction is a longitudinal direction of the substrate, and wherein the substrate includes a surface that is patterned or textured;
    a slurry reservoir configured to contain a slurry, the slurry including carbon nanostructures;
    a dispenser connected to the slurry reservoir and configured to dispense the slurry onto the surface of the substrate; and
    a doctoring member that extends in a second direction traversing the first direction and that is positioned above the surface of the substrate, the doctoring member being spaced apart from the surface of the substrate by a distance greater than about 0.01 mm.

2. The apparatus of claim 1, wherein the surface of the substrate comprises a material having high surface energy that is greater than 300 mNm$^{-1}$.

3. The apparatus of claim 1, wherein the substrate has a beveled edge.

4. The apparatus of claim 1, wherein the surface of the substrate comprises a microscopic patterned surface.

5. The apparatus of claim 4, wherein the microscopic patterned surface includes micro-pyramids and/or micro-pillars.

6. The apparatus of claim 5, wherein the microscopic patterned surface includes micro-pyramids and the micro-pyramids have a height in a range of about 500 nm to 2,500 nm and a distance between adjacent micro-pyramids is in a range of between 1,000 nm and 3,000 nm.

7. The apparatus of claim 5, wherein the microscopic patterned surface includes micro-pillars and the micro-pillars have a height in a range of about 500 nm to 2,500 nm and a distance between adjacent micro-pillars is in a range of between 1,000 nm and 3,000 nm.

8. The apparatus of claim 1, wherein the surface has a root mean squared roughness value of about 150 nm to about 500 nm.

9. The apparatus of claim 1, wherein the substrate is configured to be heated to a temperature greater than room temperature.

10. The apparatus of claim 1, wherein the apparatus includes the press and the press is configured to apply a pressure to the carbon nanostructure s that is greater than or equal to 1 Pa for in a range of about 5 seconds to about 10 minutes.

11. The apparatus of claim 1, wherein the apparatus includes the drying/pressing device.

12. The apparatus of claim 1, wherein the surface of the substrate comprises a patterned surface that includes a slotted surface, a perforated surface, serpentine stripes, and/or quatrefoil shapes.

13. The apparatus of claim 1, wherein the slurry reservoir is connected to an external vacuum line and/or includes at least one degassing device and wherein the apparatus further includes one of a press or a drying/pressing device, wherein the press is configured to apply a pressure to the carbon nanostructure sheets and wherein the drying/pressing device is configured to apply heat and pressure to the carbon nanostructure sheets.

14. An apparatus for preparing carbon nanostructure sheets, the apparatus comprising:
 a casting body including a substrate, the substrate being configured to move along a first direction, wherein the first direction is a longitudinal direction of the substrate;
 a slurry reservoir configured to contain a slurry, the slurry including carbon nanostructures, wherein the slurry reservoir is connected to an external vacuum line and/or includes at least one degassing device;
 a dispenser connected to the slurry reservoir and configured to dispense the slurry onto a surface of the substrate; and
 a doctoring member that extends in a second direction traversing the first direction and that is positioned above the surface of the substrate, the doctoring member being spaced apart from the surface of the substrate by a distance greater than about 0.01 mm.

15. The apparatus of claim 14, wherein the slurry reservoir includes one or more mixing devices or homogenizers.

16. The apparatus of claim 15,
 wherein the slurry reservoir, the mixing devices, and/or the homogenizers are configured to perform degassing of the slurry at a temperature greater than or equal to room temperature under a pressure of less than 0.01 mbar for about 1 second to about 1 minute.

17. The apparatus of claim 15, wherein the mixing devices, the homogenizers and the degassing device are configured to operate simultaneously or sequentially.

18. The apparatus of claim 14, wherein the dispenser is a spray dispenser.

19. An apparatus for preparing carbon nanostructure sheets, the apparatus comprising:
 a casting body including a substrate, the substrate being configured to move along a first direction, wherein the first direction is a longitudinal direction of the substrate;
 a slurry reservoir configured to contain a slurry, the slurry including carbon nanostructures;
 a dispenser connected to the slurry reservoir and configured to dispense the slurry onto a surface of the substrate;
 a doctoring member that extends in a second direction traversing the first direction and that is positioned above the surface of the substrate, the doctoring member being spaced apart from the surface of the substrate by a distance greater than about 0.01 mm; and
 one of a press or a drying/pressing device, wherein the press is configured to apply a pressure to the carbon nanostructure sheets and wherein the drying/pressing device is configured to apply heat and pressure to the carbon nanostructure sheets.

20. The apparatus of claim 19, further comprising a dryer that includes a heating element and is configured to operate at a temperature greater than or equal to room temperature under a pressure greater than or equal to 1 atm or under a pressure of less than 0.01 mbar for about 5 seconds to about 10 minutes.

* * * * *